(12) United States Patent
Yonezawa et al.

(10) Patent No.: US 6,741,276 B1
(45) Date of Patent: May 25, 2004

(54) CAMERA CONTROL SYSTEM

(75) Inventors: Hiroki Yonezawa, Yokohama (JP); Koichiro Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,489

(22) Filed: Jul. 9, 1999

(30) Foreign Application Priority Data

Jul. 31, 1998 (JP) ............................................. 10-217422
Jul. 31, 1998 (JP) ............................................. 10-217428

(51) Int. Cl.⁷ ................................................ H04N 7/18
(52) U.S. Cl. ....................................... 348/159; 348/143
(58) Field of Search ................................ 348/143–159, 348/211–217

(56) References Cited

U.S. PATENT DOCUMENTS 5,422,697 A    6/1995  Ichinomiya et al. ......... 354/274
6,208,379 B1 *  3/2001  Oya et al. ............... 348/211.11
6,510,553 B1 *  1/2003  Hazra ......................... 725/87

* cited by examiner

*Primary Examiner*—Andy Rao
(74) *Attorney, Agent, or Firm*—Fitzpatrick, Cella, Harper & Scinto

(57) ABSTRACT

In a camera control system, a video sending terminal sends video from a video camera through a network to client terminals. The video camera is controlled by control commands from a client terminal which has been issued control from the video sending terminal in response to a request for control by the client terminal. The client terminal currently controlling the video camera is notified of a new request for control of the video camera made by another client terminal so that client terminals are notified of the locality of the video camera control.

42 Claims, 22 Drawing Sheets

FIG. 5A
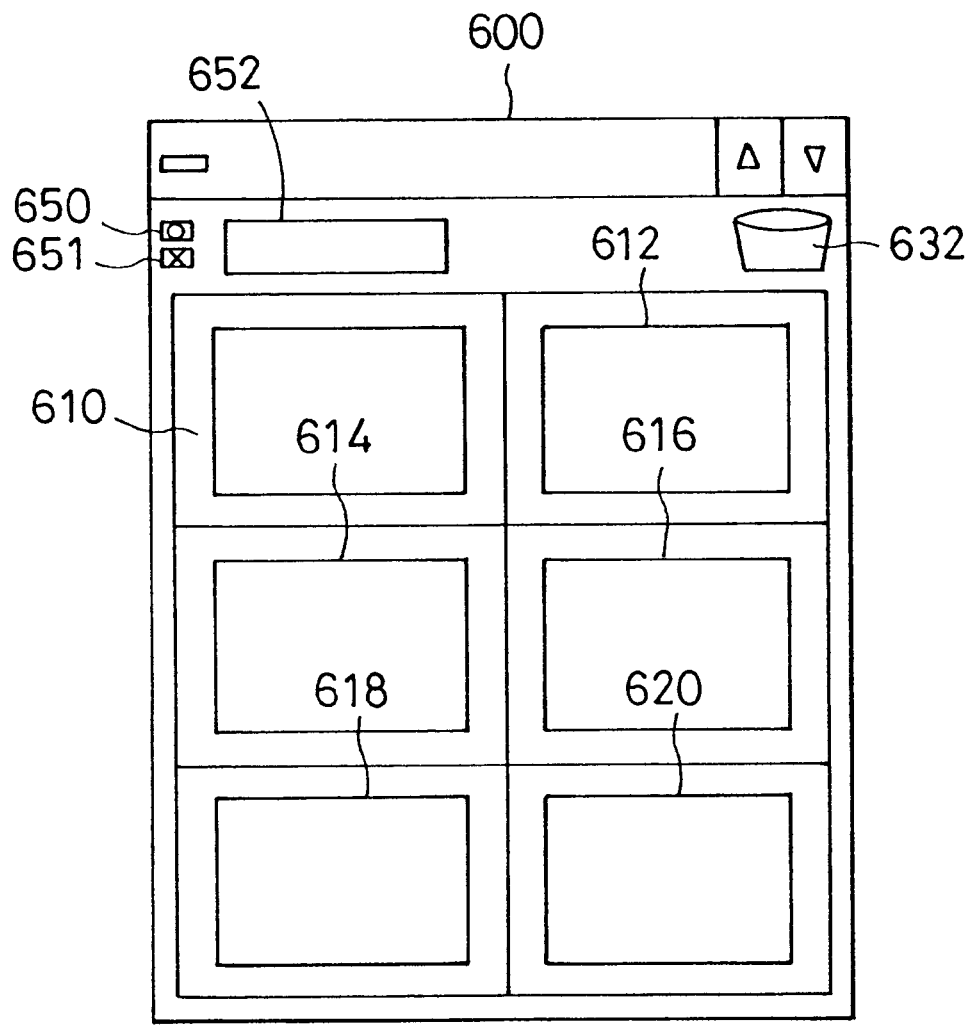
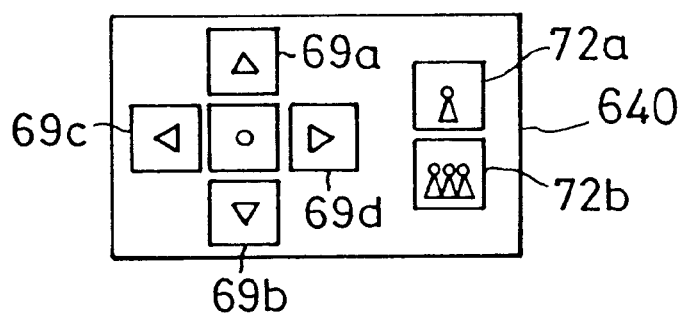
FIG. 5B

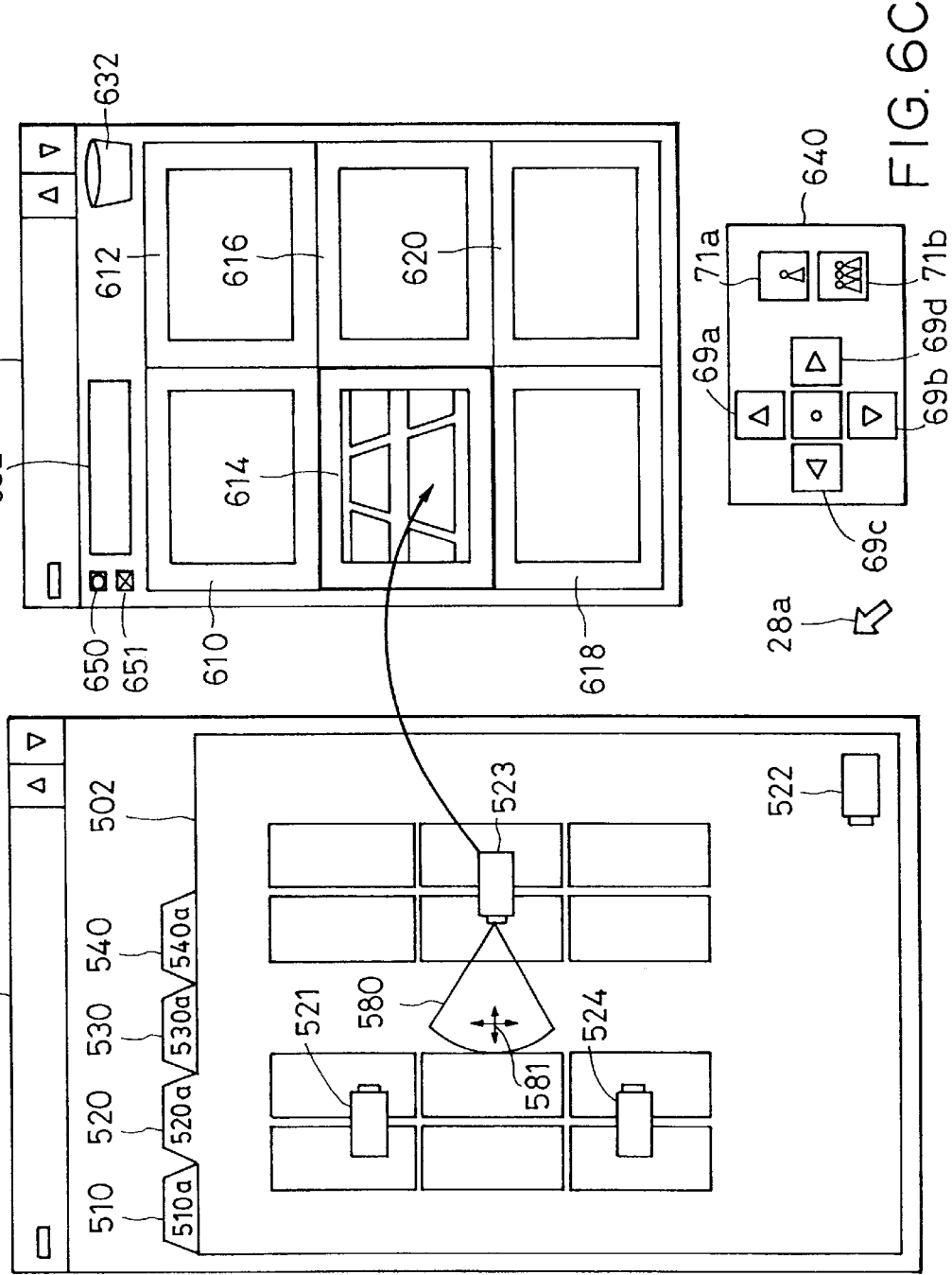

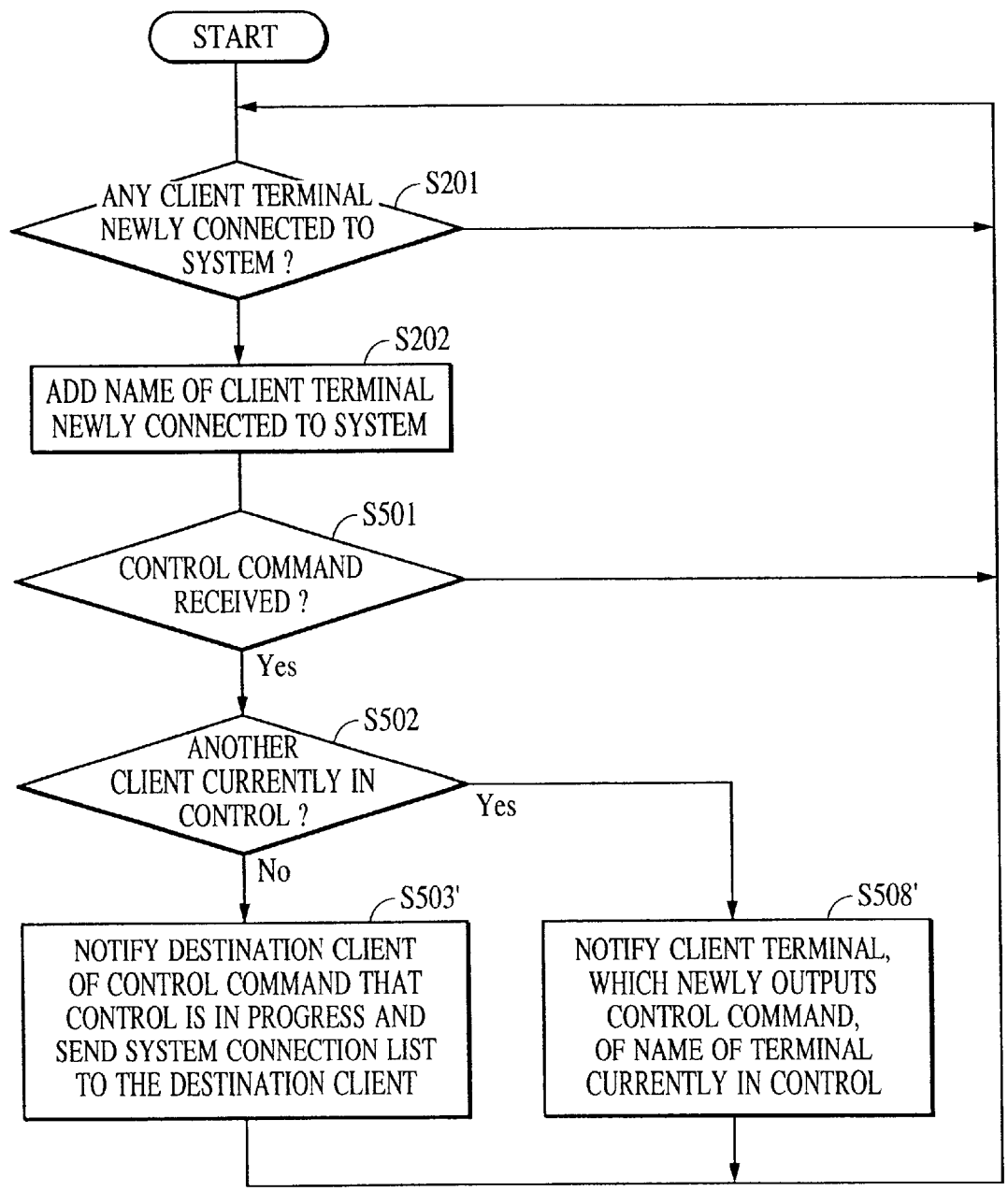

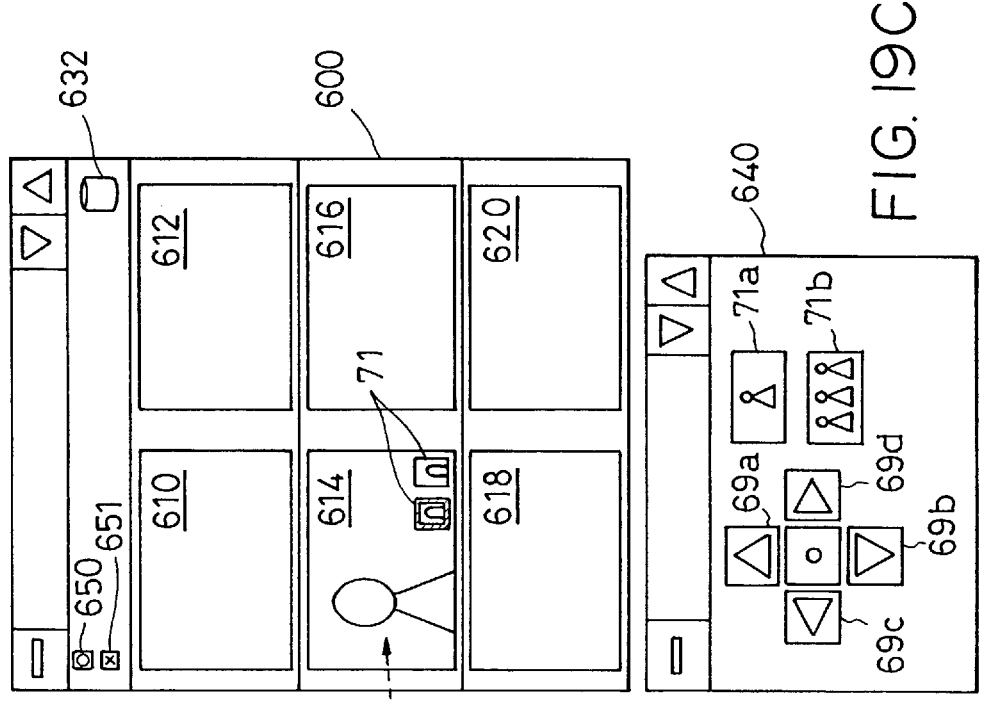
FIG.19B
FIG.19C
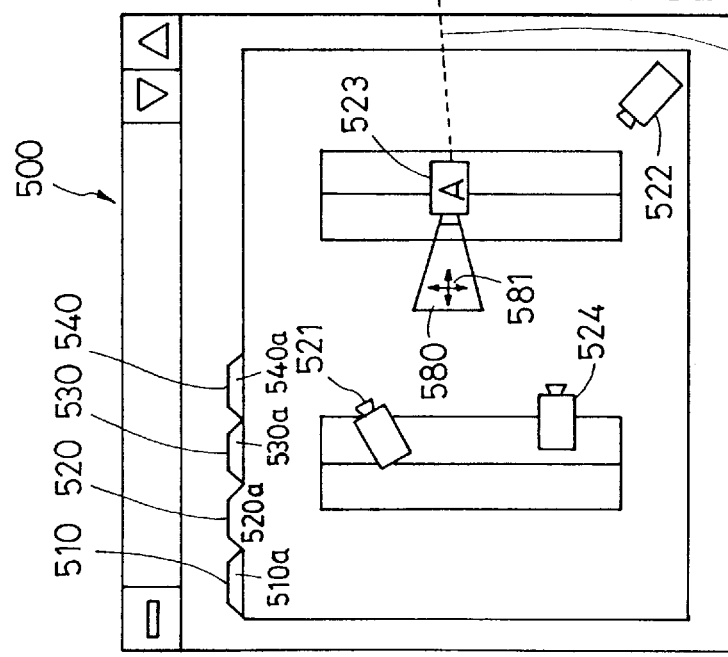
FIG.19A

CAMERA CONTROL SYSTEM

BACKGROUND OF THE INVENTION

1. Field of the Invention

The present invention relates to a camera control system that allows a plurality of computer terminals to control video cameras, particularly a monitor camera, through a network.

2. Description of the Related Art

Conventional monitoring systems include a synthesizer for synthesizing analog videos output by a plurality of video cameras with camera direction adjusting capability, and a switcher that switches videos, from the video cameras, presented on monitors. Such a system is typically installed in a relatively small-scale building, and is a localized monitoring system. Newly marketed is a remote monitoring system which offers a dramatically extended transmission line employing a digital network system such as LAN or ISDN, instead of analog cable, as a transmission line for a video signal from a video camera.

The conventional systems further employ a personal computer (PC) in a monitoring terminal to present videos on GUI (Graphical User Interface) so that even an unexperienced user may easily control the system.

In such a system, it may happen that a plurality of users make their own computers display the video from the same video camera at almost the same time, or operate the same video camera from their own computer terminals at almost the same time. When a contention for gaining control of the same video camera takes place, control of the video camera is given to only a single computer terminal. When a certain computer currently has control over the video camera, the system must perform a complex process, such as a request queueing process or exclusive control process, with another computer terminal requesting control over the video camera.

Client terminals are not notified of information about control acquisition status for the video camera, and if the clients failed to gain control, they are unable to know whey they did.

SUMMARY OF THE INVENTION

Accordingly, it is an object of the present invention to provide a camera control system that notifies a client's computer terminal of the locality of control of a video camera to help a user easily know the status of the video camera.

According to one aspect of the present invention, the client terminal for controlling a video camera by gaining control of the video camera includes an output unit for outputting, to a video sending terminal, a request for the control of the video camera, and a notifying unit for notifying another client terminal, which currently has the control of the video camera, that the output unit has issued the request for the control of the video camera to the video sending terminal.

According to another aspect of the present invention, the video sending terminal for sending to client terminals a video from a video camera through a network and controlling the video camera in accordance with a control command from a client terminal, includes a control unit for controlling the video camera in accordance with the control command of the video camera, and a notifying unit for notifying a first client terminal that a control command of the video camera has been newly received from a second client terminal, when the control command has been newly received from the second client terminal different from the first client terminal which has issued the control command under which the control means currently controls the video camera.

According to yet another aspect of the present invention, the client terminal for controlling a video camera by issuing a control command to a video sending terminal, includes an output unit for outputting the control command for the video camera to the video sending terminal, and a notifying unit for notifying another client terminal, which currently controls the video camera, that a control command for the video camera has been issued to the video sending terminal.

According to yet another aspect of the present invention, the client terminal for controlling a plurality of video cameras through a network, includes a display unit for selectively displaying videos from the plurality of video cameras on the same screen, and a retrieving unit for retrieving the information about the user of another client terminal, if the other client terminal receives any video, among the videos from the plurality of video cameras, presented in the display unit, wherein, for displaying, the display unit superimposes the information about the user of the client terminal retrieved by the retrieving unit onto the video which the another client terminal also receives from the video camera.

According to yet another aspect of the present invention, the control method for a camera control system, in which a client terminal having control controls a video camera connected to a video sending terminal, includes the steps of outputting a request for the control of the video camera to the video sending terminal, receiving the request for the control of the video camera output in the outputting step, issuing the control of the video camera in response to the request for the control of the video camera received in the receiving step, and notifying the client terminal, which currently has the control of the video camera, that another client terminal has newly made a request for the control of the video camera, when the request for the control of the video camera has newly been made by the other client terminal.

According to yet another aspect of the present invention, the control method for a camera control system, in which a client terminal controls a video camera by sending a control command to a video sending terminal, includes the steps of outputting the control command of the video camera to the video sending terminal, controlling the video camera in accordance with the control command of the video camera output in the outputting step, and notifying a first client terminal that a control command of the video camera has been newly received from a second client terminal, when the control command has been newly received from the second client terminal different from the first client terminal which has issued the control command under which the control step currently controls the video camera.

According to yet another aspect of the present invention, the camera control method, in which a client terminal controls a plurality of video cameras by issuing a control command through a network, includes the steps of selectively displaying videos from the plurality of video cameras on the same screen, and retrieving the information about the user of another client terminal, if the other client terminal receives any video, among the videos from the plurality of video cameras, presented in the displaying step, wherein, for displaying, the displaying step superimposes the information about the user of the other client terminal retrieved in the retrieving step onto the video which the other client terminal also receives from the video camera.

According to yet another aspect of the present invention, the storage medium stores a program that is executed by a video sending terminal that controls a video camera in accordance with a control command from a client terminal having the control of the video camera, and the program includes the steps of issuing the control of the video camera in response to a request for the control of the video camera output by the client terminal, and notifying the client terminal, which currently has the control of the video camera, that the request for the control of the video camera has been newly issued, when the request for the control of the video camera has been newly issued with the video camera under control.

According to yet another aspect of the present invention, the storage medium stores a program that is executed by a client terminal that controls a video camera by gaining control, and the program includes the steps of outputting a request for the control of a video camera to a video sending terminal, and notifying another client terminal, which has currently the control of the video camera, that the request for the control of the video camera has been issued to the video sending terminal, when the other client terminal currently has the control of the video camera.

According to yet another aspect of the present invention, the storage medium stores a program that is executed by a video sending terminal that sends a video from a video camera to a client terminal through a network and controls the video camera in accordance with a control command from the client terminal. The program includes the steps of controlling the video camera in accordance with the control command of the video camera, and notifying a first client terminal that a control command of the video camera has been newly received from a second client terminal, when the control command has been newly received from the second client terminal different from the first client terminal which has issued the control command under which the video camera is currently controlled.

According to yet another aspect of the present invention, the storage medium stores a program that is executed by a client terminal that controls a video camera by outputting a control command to a video sending terminal, and the program includes the steps of outputting the control command of the video camera to the video sending terminal, and notifying another client terminal, which currently controls the video camera, that a control command of the video camera has been output to the video sending terminal, when the video camera is controlled by the other client terminal.

According to yet another aspect of the present invention, the storage medium stores a program that is executed by a client terminal that controls a plurality of video cameras through a network, and the program includes the steps of selectively displaying videos from the plurality of video cameras on the same screen, and retrieving the information about the user of another client terminal, if the other client terminal receives any video, among the videos from the plurality of video cameras, presented in the displaying step, wherein, when displayed, the information about the user of the other client terminal retrieved is superimposed onto the video which the other client terminal also receives from the video camera.

These and other objects and features of the present invention will become apparent from the following description and the accompanying drawings.

BRIEF DESCRIPTION OF THE DRAWINGS

FIGS. 5A and 5B show a video display window and a camera control panel in a table mode in each embodiment;

FIGS. 6A, 6B and 6C show a video display window and a bitmap display presented on screen when a drag and drop operation is made, and a camera control panel;

FIG. 18 is a flow diagram showing the operation of a video sending terminal in the fourth embodiment;

FIGS. 19A, 19B and 19C show a video display window and the display presented on a monitor screen in the client terminal, and a camera control panel;

DESCRIPTION OF THE PREFERRED EMBODIMENTS

Figure 1:
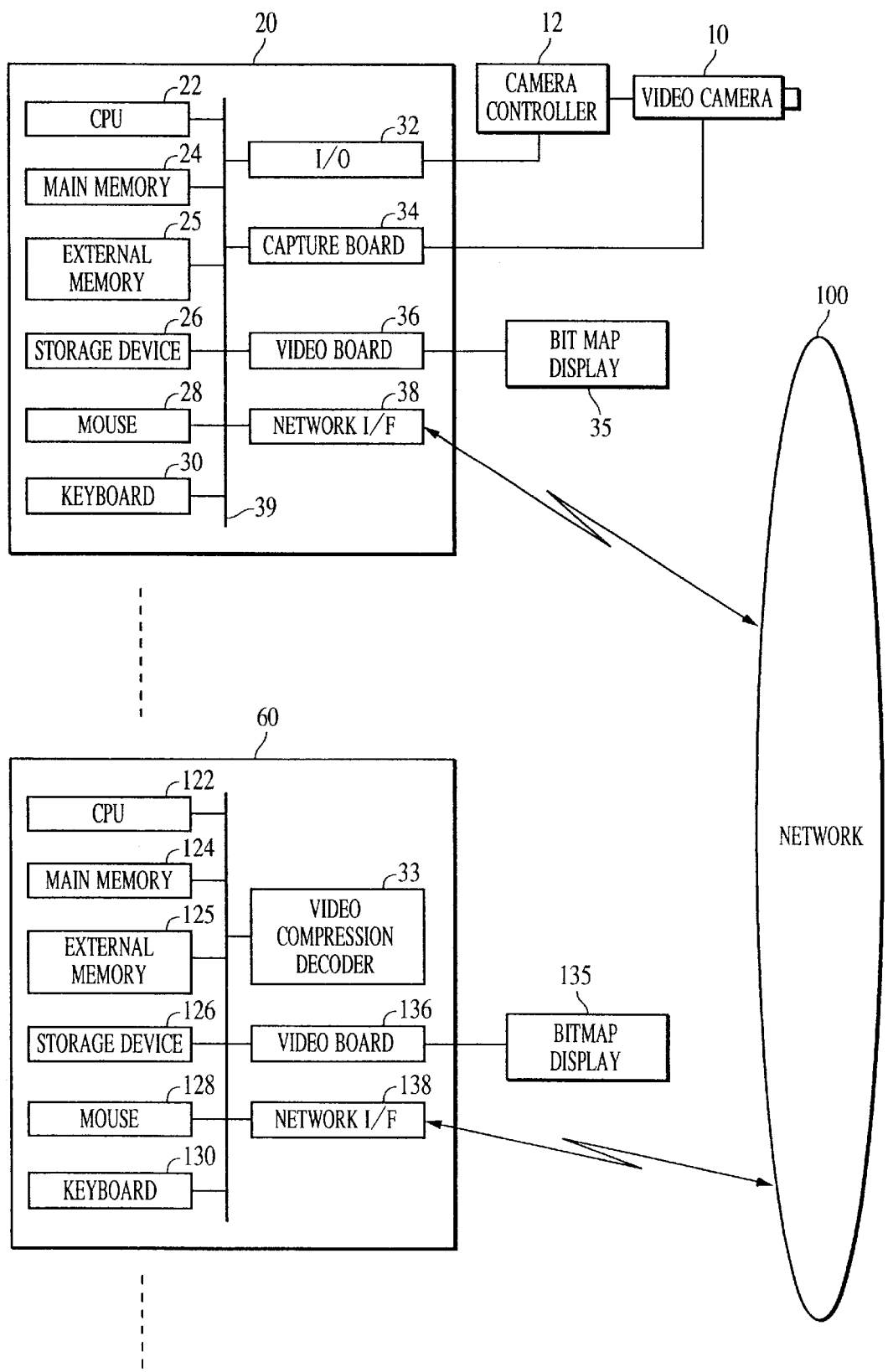
FIG. 1 is block diagram of a camera control system of one embodiment of the present invention.

Referring to the drawings, a first embodiment of the present invention is discussed.

FIG. 1 is a block diagram showing an entire system including a video sending terminal and a client terminal, each including a computer. A video signal generator on the video sending terminal side of the first embodiment includes, for example, a video camera 10, a camera control circuit 12 for controlling the video camera 10, a video sending terminal 20, and a bitmap display 35.

The camera control circuit 12 directly controls the video camera (hereinafter simply referred to as camera) 10 for panning, tilting, zooming, focusing, and aperture adjustment, in accordance with external control signals from the video sending terminal 20. The external control signals are input through an RS-232C interface, for example. The camera control circuit 12 may control the switch on/off of the camera 10.

The video sending terminal 20 is a computer that controls the camera 10 connected to the camera control circuit 12 by sending a control code to the camera control circuit 12, and sends video data obtained from the camera 10 over a network through a network interface 38. A workstation (WS) or a personal computer (PC) may be used as the computer.

The construction of the video sending terminal 20 in the first embodiment is now discussed.

The video sending terminal 20 includes CPU 22 for controlling the inside of the terminal 20, an external memory 25 to which a floppy disk or CD-ROM is loaded, a storage device 26 such as a hard disk, a mouse 28 as a pointing device, a keyboard 30, an I/O board 32, a video capture board 34, a video board 36, the network interface 38, and a system interface 39 that interconnects CPU 22 through the network interface 38.

In this arrangement, the pointing device is not limited to a mouse. Alternatively, the pointing device may be a touch panel on the display 35.

The software for this system may be read from a storage medium on the external memory 25 or the network interface 38, and stored in the storage device 26.

The I/O board 32, connected to the camera control circuit 12, exchanges camera control signals. Alternatively, the camera control circuit 12 may be contained in the video sending terminal 20. The video capture board 34 captures a video output signal VD from the camera 10. The video output signal VD may be an analog signal such as NTSC signal or a digital signal. For an analog signal, however, a function of A/D conversion is required. Data compression is not required of the video capture board 34, and if the video capture board 34 has no data compression feature, it is preferred that data compression is performed in software. The captured video is sent to a client terminal 60 via the network interface 38 and the network 100. The video is also output to the video board 36 from the video capture board 34 through the system interface 39, and is presented at any position on the bitmap display 35. CPU 22 performs the control of the position of the video by indicating a display position or display area to the video board 36.

In the above arrangement, the video sending terminal 20 transmits video to a remote client terminal 60 via the network 100, and receives a camera control signal from the client terminal 60 to control the camera 10.

The client terminal (video receiving terminal) 60 shown in FIG. 1 is now discussed.

The client terminal 60 transmits a control signal of the camera 10 to the video sending terminal 20. In response to the control signal, the video sending terminal 20 control the video camera, and sends the status of the camera 10 obtained as a result of control, to the client terminal 60 through the network 100. The client terminal 60 displays the status of the camera 10 on a display unit such as a bitmap display 135. The client terminal 60 receives the video data coming in from the video sending terminal 20, and decompresses the data that was compressed and coded in software, and displays the video data on the display unit on a real time basis. As understood from FIG. 1, the client terminal 60 is identical in construction to the video sending terminal 20 without the camera 10, the camera control circuit 12 and the video capture board 34. Components having the same function in the client terminal 60 are designated with a corresponding reference numeral in the video sending terminal 20 with 100 added in FIG. 1. The removal of these components from the video sending terminal 20 is not a requirement. If CPU 22 takes time to expand the video data for its insufficient performance, an extension board having a decoding and expanding capability may be used.

In the first embodiment, the video sending terminal 20 and the client terminal 60 are separately arranged. However, it is practical to integrate two basic functions of the two terminals into one apparatus which is used as a video sending terminal and a client terminal as well.

In the above arrangement, the video data is received from the remote video sending terminal 20 via the network 100, and is presented at any position on the bitmap display 135, namely, a monitor display. The client terminal 60 sends, to the video sending terminal 20, a video camera control code corresponding to a control command of the camera 10 an operator inputs through a keyboard 130 or a mouse 128.

Figure 2:
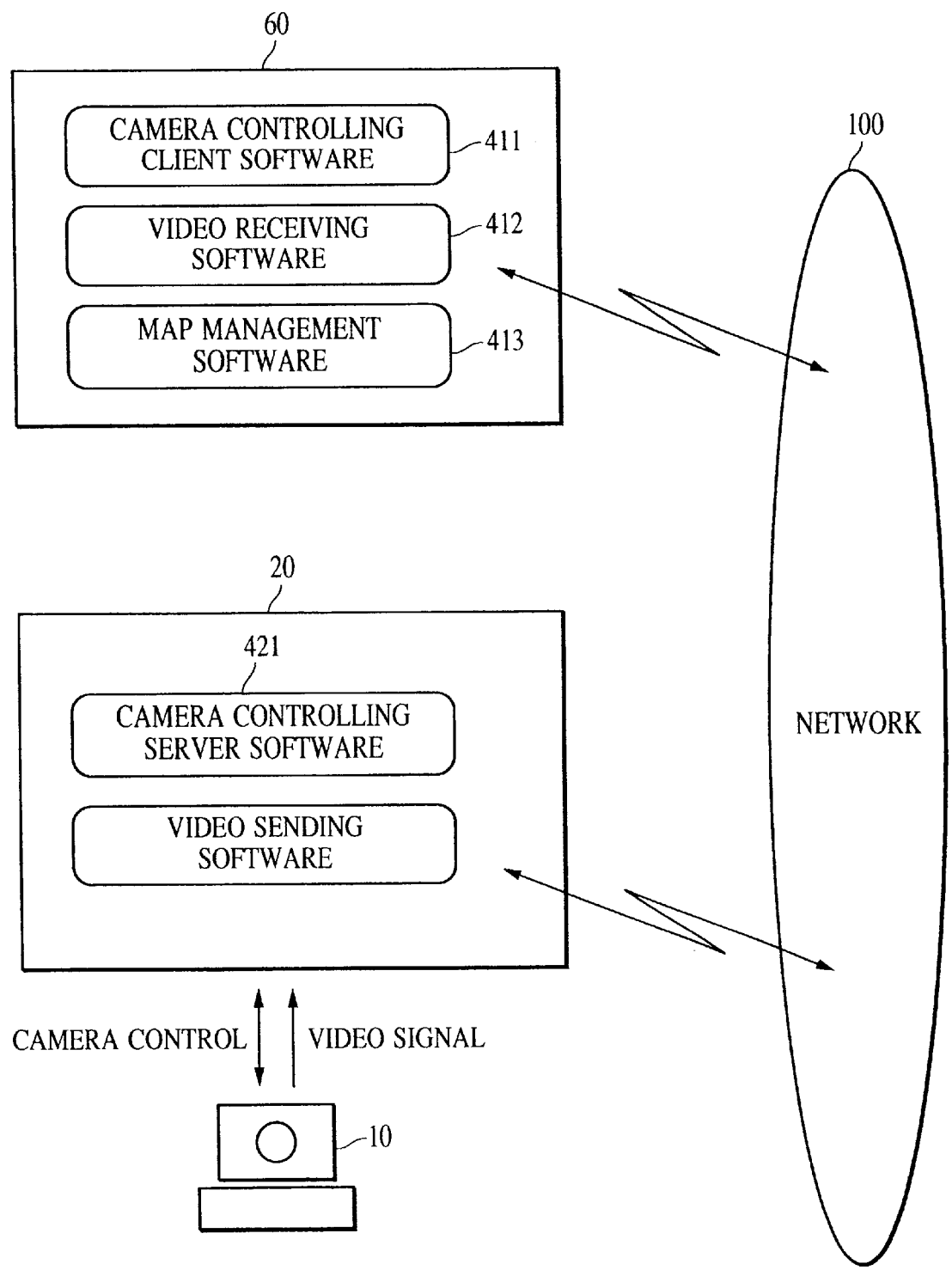
FIG. 2 is a block diagram about software of the one embodiment of the present invention.

Referring to FIG. 2, the software structure of the client terminal 60 and the video sending terminal 20 in the first embodiment is now discussed. The software programs installed in the client terminal 60 include camera control client software 411 which remotely controls the camera 10 connected to each video sending terminal 20 on the network 100, video receiving software 412 which decodes, expands, and displays the video data transmitted in the form of packets from the video sending terminal 20, and map management software 413 which graphically displays the position, panning and zooming actions of the camera using a map, a camera symbol, and a scope presentation shown in FIG. 6, and has a GUI capable of camera control. CPU 122 executes a variety of processes under the control of the software.

The video receiving software 412 plays a critical role in managing the cameras 10 in the video sending terminals 20 connected to the network 100, and holds information indicative of the current status notified by the video sending terminal 20, including the camera name of each camera 10, the host name of the video sending terminal (computer) 20 to which the camera 10 is connected, the camera movements such as panning/tilting, and zooming, the information about the camera 10 indicative of whether the camera 10 is now controllable, which camera is currently controlled, and which video camera now displays the video. These pieces of information are stored in a main memory 124, and are shared by the camera control client software 411, and the video receiving software 412 to update the displayed state of the camera symbol.

The software installed in the video sending terminal 20 include camera controlling server software 421 which controls the camera 10 connected to the video sending terminal 20 in panning/tilting and zooming control and white balance adjustment, and a video sending software 422 which stores the video data output by the camera 10 while cooperating with the video receiving software 412.

Figure 3:
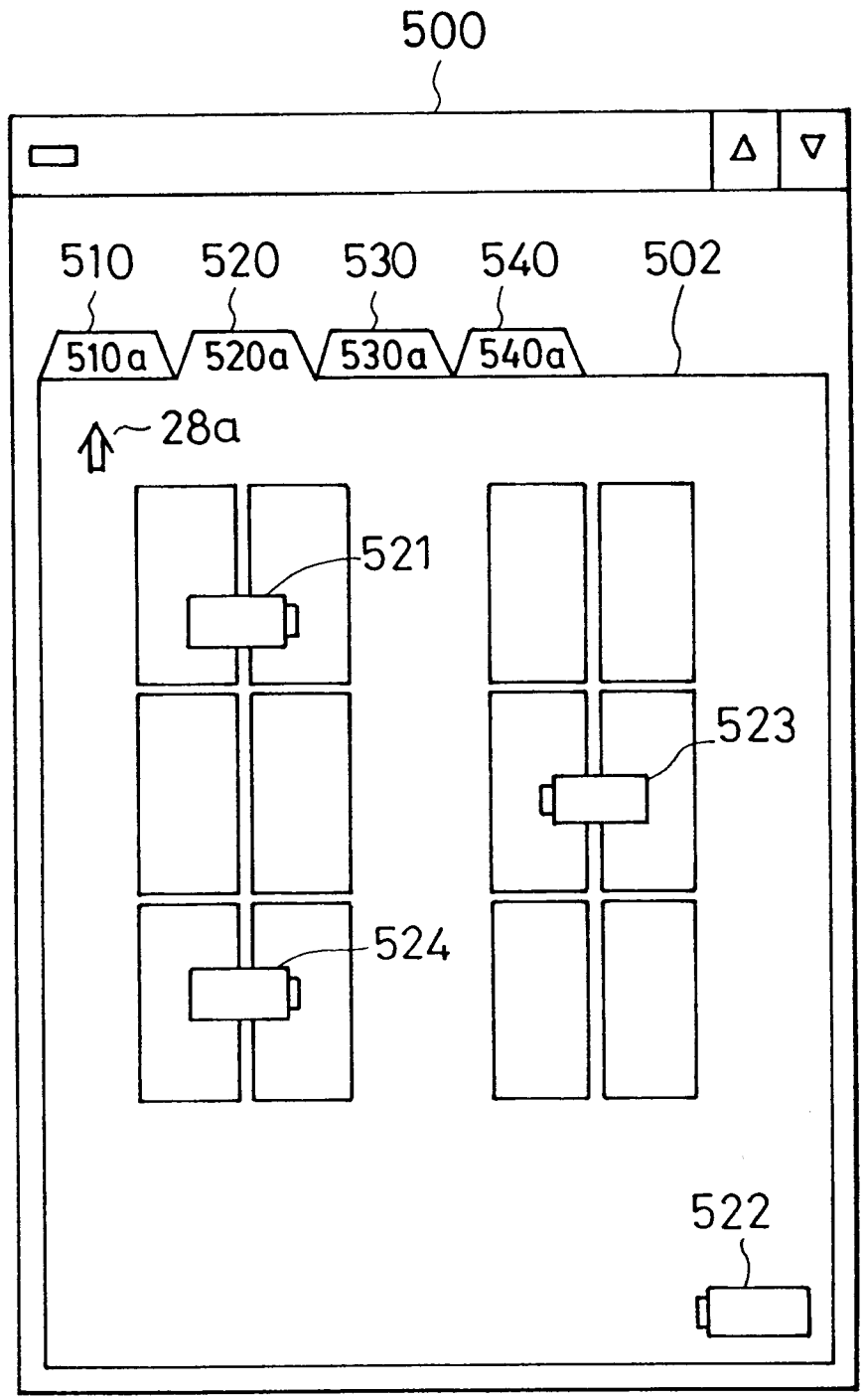
FIG. 3 shows a display presented on a client terminal in each embodiment.
Figure 4:
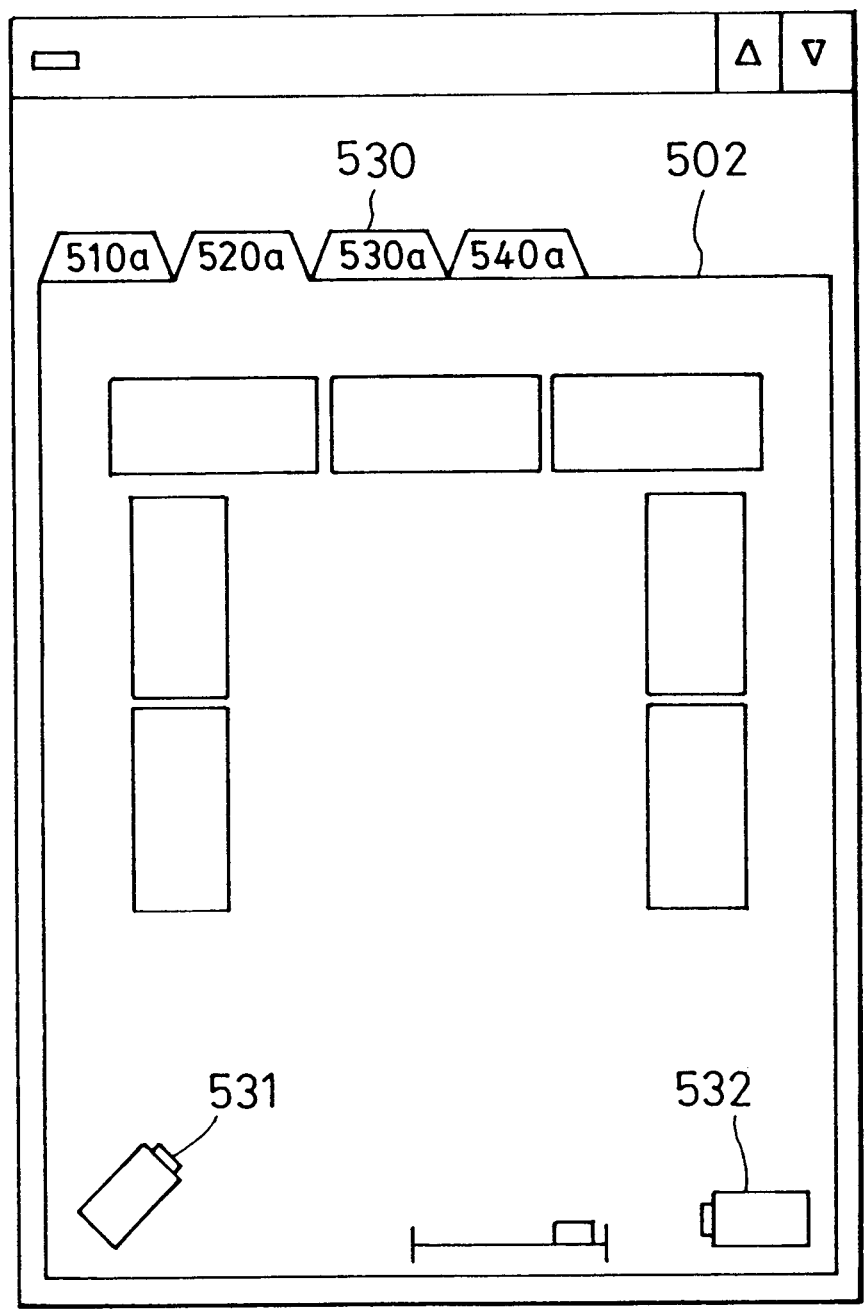
FIG. 4 shows a display screen when the system switches to a map.

FIG. 3 is one example of the display presented on the bitmap display 135 in the client terminal 60. A map window 500 manages in this embodiment a plurality of maps 510, 520, 530, and 540 indicating offices, stores, and warehouses. The number of maps depends on the performance of the system, and there is no particular limitation to it. The maps 510, 520, 530, and 540 are respectively accompanied by tags 510a, 520a, 530a, and 540a. By moving a cursor 28a to any of the tags 510a, 520a, 530a, and 540a, and by clicking the mouse 28 there, the map associated with that tag is presented on a map display area 502. The camera symbol positioned on the map is also presented together. Referring to FIG. 3, the map 520, out of the maps 510 through 540, is presented on the map display area 502. Camera icons 521, 522, 523, and 524 are also displayed on the map 520. If the tag 530a of the map 530 is clicked, the map display area 502 presents the map 530 as shown in FIG. 4, together with camera icons 531 and 532.

FIGS. 5A and 5B show a video display window 600 presenting a video signal input and a camera control panel 640. As shown, a video signal received through the network 100 is presented on each window.

Referring to FIG. 5A, the video display window 600 includes a total of six video display areas 610, 612, 614, 616, 618, and 620 in this embodiment, but the present invention is not limited to the six video display areas. The map window 500 shown in FIG. 3 and the video display window 600 shown in FIG. 5 may be presented on the same display screen, or may be presented on the separate display screens, namely, on the separate monitor devices. In this embodiment, the video display window 600 is provided with a trash icon 632 to delete a displayed camera video from the video display area. A camera control panel 640 is also given together with the video display window 600. The camera control panel 640 is provided with buttons for a variety of camera control functions, including panning/tiling and zooming. The camera control panel 640 of FIG. 5B may be presented on the same display screen as the map window 500 or the video display window 600, or may be presented on a separate screen.

Designated 69a, 69b, 69c and 69d are respective buttons for controlling the direction of the camera to the upward, to the downward, to the left and to the right. A button 72a adjusts the camera 10 to zoom to the telephoto side and a button 72b adjusts the camera 10 to zoom to the wideangle side.

Referring to FIGS. 6A, 6B and 6C through FIG. 8, the GUI (graphic user interface) of the camera control system of this embodiment is now discussed.

In this embodiment, the camera icon on the map 520, 530, . . . , is dragged and dropped (the mouse 28 is moved with its button kept pressed to move a cursor 28a to an object of interest (drag action) and the button is then released with the cursor 28a on the object of interest (drop action)), and hereinafter also referred to D&D) in any video display area (area 614 in FIG. 6B) in the video display window 600, and a moving picture from a camera corresponding to the dragged and dropped icon is presented on the video display area 600.

Figure 7:
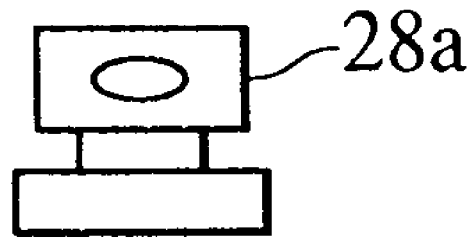
FIG. 7 shows the shape of a mouse cursor when the drag and drop operation is made.

FIGS. 6A and 6B show the display screen in which the camera icon 523 is dragged and dropped in a video display area 614. In the middle of the drag action, the cursor 28a looks like the camera as shown in FIG. 7, and the user thus learns that the D&D action is in progress. The map management software 413 retrieves the ID number of the camera 10 from the position information of the dragged camera icon 523 and notifies the video receiving software 412 of the ID number of the dragged camera 10. Based on the ID number, the video receiving software 412 checks the pan/tilt, the camera name of the camera 10, and the host name of the video sending terminal 20 to which the camera 10 is connected, and then notifies the camera control client software 411 and the map management software 413 of these pieces of information.

In accordance with these pieces of information, the camera control client software 411 establishes the connection with the camera controlling server software 421 of the video sending terminal 20 to which the camera 10 is connected, through the network 100. The camera control thereafter is carried out by the camera control client software 411 and the camera controlling server software 421, and the camera control client software 411 notifies the camera controlling server software 421 of the pan/tilt information of the camera 10 each time the pan/tilt is adjusted.

The map management software 413 sends data to unshown VRAM (video RAM) in the video board 136 in order to change the orientation of the camera icon to match the actual direction of the camera 10, draw a scope 580, indicating that the video camera is now active as shown in FIG. 6, and draw a control pointer 581 in the scope 580 to control the pan/tilt and zoom of the camera 10. To display these data, the data of the map stored in the main memory 24 is updated.

The map management software 413 is notified of information such as the pan/tilt of the camera 10 by the video receiving software 412 each time the information needs any update. When any adjustment is made in the pan/tilt and zoom of the camera 10 through the camera control panel 640, the adjustment is immediately reflected in the statuses of the camera icons 521, 522, 523, . . . , 531, 532, 533, . . . The actual transmission of the video is performed in response to a request from the video receiving software 412.

The video receiving software 412 requests the video sending software 422 of the video sending terminal 20 connected to the camera 10 of interest to send data of one frame through the network 100. In response to the request, the video sending software 422 divides captured latest frame data into packets to send them to the video receiving software 412. The video receiving software 412 reorganizes the packets into a frame and displays it on a corresponding video display area, and makes a request to send again. By repeating these steps at a high speed, the system displays the moving picture of the camera 10 on the bitmap display 135.

In order to display videos of a plurality of cameras 10, processes including the request to send videos, the compression of the captured video, packetization, network communication, packet reception, frame reorganization, decoding, expansion, and displaying are repeated by the video receiving software 412 and the video sending software 422 which is installed in the video sending terminal 20 connected to each camera 10.

Figure 8B:
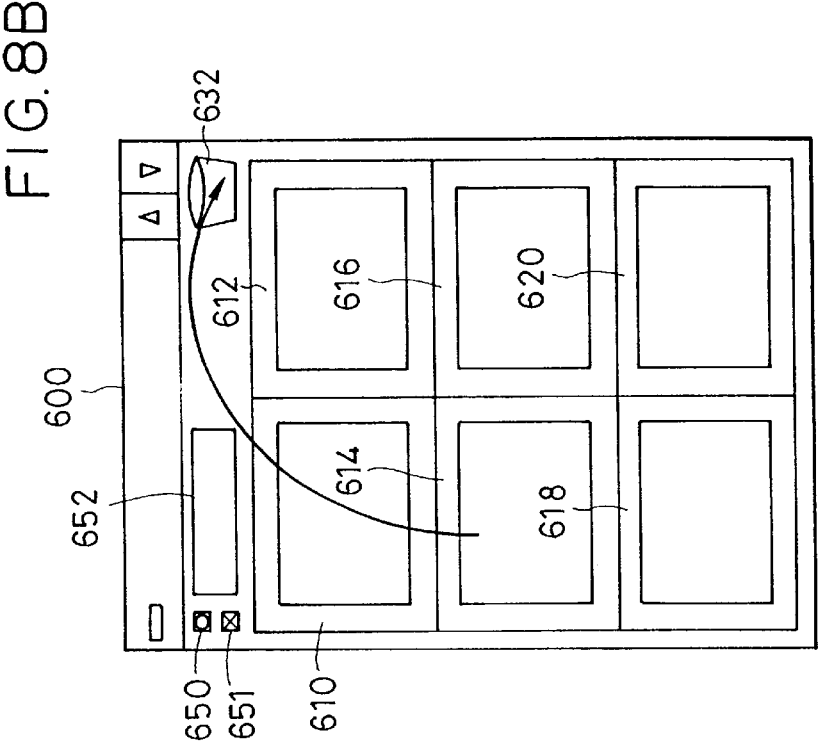
FIGS. 8A, 8B and 8C show a video display window and a bitmap display presented on screen when a drag and drop operation is made, and a camera control panel.
Figure 8C:
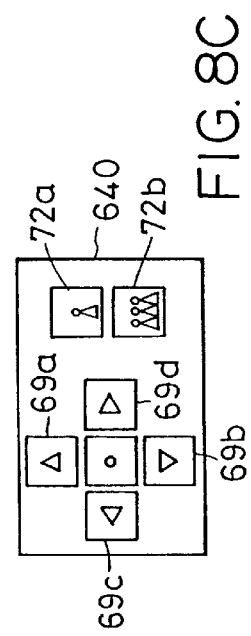
Figure 8A:
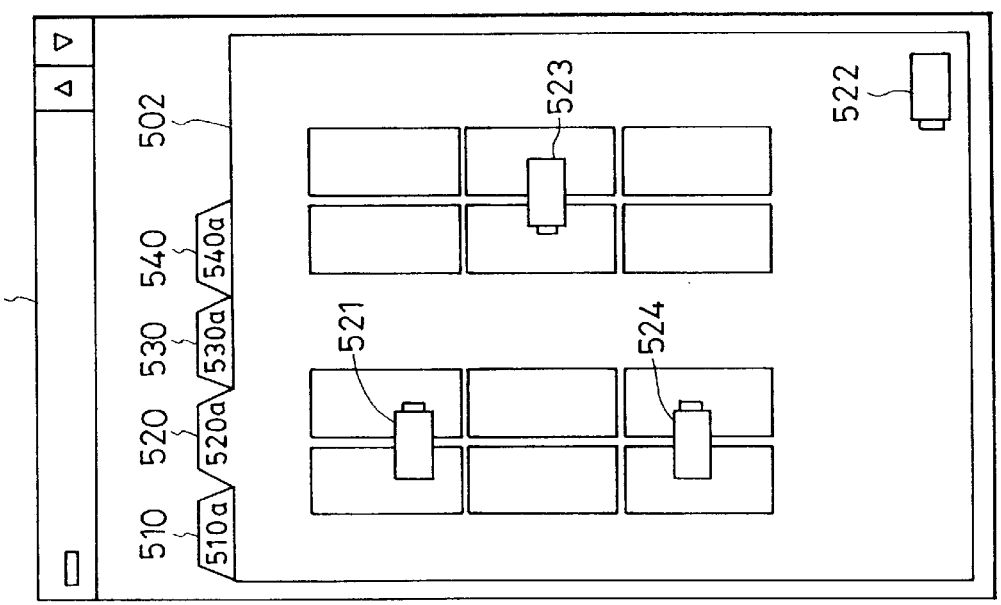

FIG. 8B shows the screen when the presentation of the video from the camera 10 corresponding to the camera icon 523 displayed on the video display area 614 has stopped. To stop displaying the video from the video camera, the video display area of the video the user wants to quit displaying is dragged and dropped into the trash icon 632.

The video receiving software 412 clears the video presented on the video display area 614, and stops issuing the request to send the video to the video sending software 422. The video receiving software 412 notifies the camera control client software 411 and the map management software 413 that the displaying of the video is stopped. Upon receiving the notice of display stopping, the camera control client software 411 disconnects the network connection with the camera controlling server software 421. The map management software 413 removes the scope presentation from the camera icon 523, and updates the data stored in the main memory 124.

In the camera control system of this embodiment, the transmission and reception of the video data are independently carried out from the transmission and reception of data required to execute the camera control.

The transmission and reception of the video data of the video camera 10 are performed by connecting the video receiving software 412 in the client terminal 60 and the video sending software 422 in the video sending terminal 20 via the network 100. The connection between the video receiving software 412 and the video sending software 422 is hereinafter referred to as "video connection".

On the other hand, the transmission and reception of the data for the camera control are performed by connecting the camera control client software 411 in the client terminal 60 and the camera controlling server software 421 in the video sending terminal 20 via the network 100. The connection between the camera control client software 411 and the camera controlling server software 421 is hereinafter referred to as "camera connection".

The connection, between the client terminal 60 and the video sending terminal 20, established by dragging and dropping the above-referenced camera icon onto the video display area is hereinafter referred to as "system connection". In other words, the execution of the system connection means both the camera connection and video connection are concurrently executed.

To perform the transmission and reception of the video data between the video receiving software 412 and the video sending software 422 in this embodiment, the video receiving software 412 that controls the process in the client terminal 60 issues a request-to-send video command to the video sending software 422 and the video sending software 422 sends the video data of one frame to the video receiving software 412.

When a single video sending terminal 20 establishes the video connection with the video receiving software programs 412 of a plurality of client terminals 60, the video sending software 422 receives the request-to-send video commands from the video receiving software programs 412 almost at the same time. The video sending software 422 processes the request-to-send video commands in the order of arrival.

The process time from the reception of a request-to-send video command to the transmission of the video data of one frame is about 10 ms or so. When the video connection is established with a plurality of video receiving software programs 412, the transmission rate of the video data drops depending on the number of connections (although, also depending on the frequency of occurrences of request-to-send video commands). When a computer having an average performance is used for the video sending terminal 20, the video sending software 422 can send the video data at a rate of 10 frames/s to the video receiving software 412 with the number of video connections of 10 (namely, the sending terminal 20 sends the video data to 10 client terminals 60). No problem is likely with this level of performance.

When the panning, tilting or zooming action is performed on the camera 10, a duration of time of several seconds elapses between the reception and execution of a control command, and is considerably longer than the process time for the video data. If the camera controlling server software 421 processes the control commands simply in the order of arrival, with a view to the user's requirement to monitor the video with the video camera set in a controlled state subsequent to the camera controlling, the client terminals may contend for the control of the camera 10. For that reason, this embodiment introduces the camera control concept in which a single client 60 only, rather than a plurality of clients 60, has the control over the camera 10 at the same time.

In this embodiment, the request for the control of the camera 10 is made by switching the video display area to a heavy-outlined one. To switch to the heavy-outlined area, the cursor 28a is moved to a desired video display area using the mouse 28, and the mouse 28 is then double-clicked. The control of the camera 10 is released by double-clicking the heavy-outlined video display area to notify the video sending terminal 20 of the release of the control of the camera 10.

When an indicator 650 presents a 'o', the control of the camera 10 corresponding to the heavy-outlined video display area (video display area 614 in FIG. 6) is gained by its own client terminal. A message area 652 presents the name of another client terminal 60 which has made a request for the control of the video camera when the request for the control has been made.

When the indicator 650 presents the letter 'X', the control of the camera 10 corresponding to the heavy-outlined video display area (video display area 614 in FIG. 6) is now gained by another client terminal 60. The message area 652 shows the name of the client terminal 60 which currently has the control of the camera 10.

Figure 9:
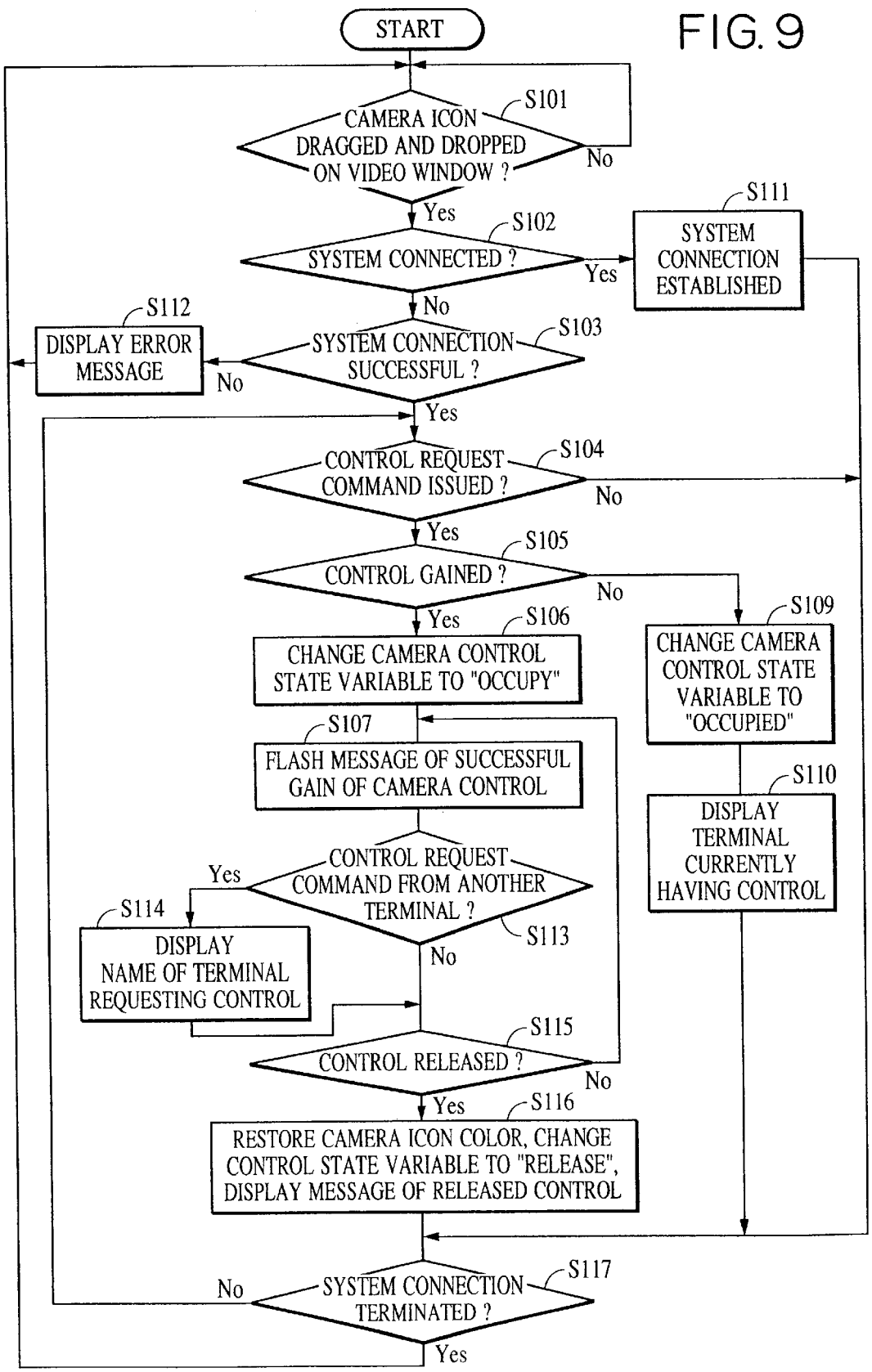
FIG. 9 is a flow diagram showing the operation of a client terminal in a first embodiment of the present invention.
Figure 10:
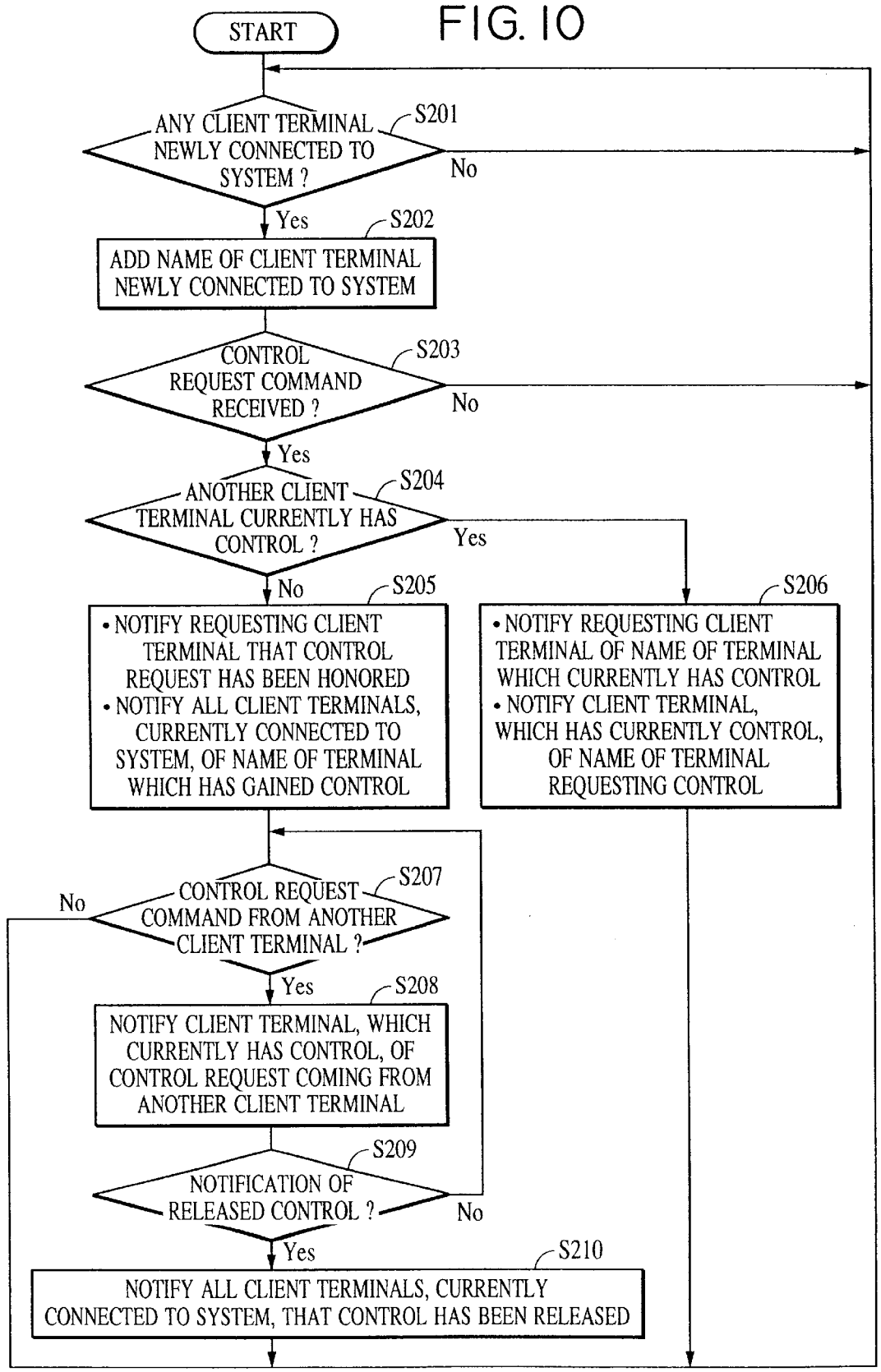
FIG. 10 is a flow diagram showing the operation of the video sending terminal in the first embodiment.

FIG. 9 is a flow diagram showing the operation of the client terminal 60. FIG. 10 is a flow diagram of the operation of the video sending terminal 20. To execute the processes shown in FIG. 9 and FIG. 10, the software programs stored in the storage device are downloaded to respective terminals and the CPUs executes the respective processes under the control of the software programs.

In step S101 in FIG. 9, the camera icon 523 is dragged and dropped onto the video display area 614 as shown in FIGS. 6A and 6B. In step S102, the camera control client software 411 checks that the system connection is established with the video sending terminal 20 corresponding to the camera icon 523. When the system connection is established, the process goes to step S111 to present on the bitmap display 135 the message to the effect that the system connection is established. When no system connection with the video sending terminal 20 is established, a request is made to connect to the video sending terminal 20. The ID address of its own terminal 60 (or client terminal name) is notified together.

Referring to FIG. 10, the process by the video sending terminal 20 is discussed. When any client terminal 60 makes a request for the system connection in step S201, the process goes to step S202 in which the name of the client terminal newly connected is added to a system connection list held in the main memory 24. The video sending software 422 performs the video connection, sending the video picked up by the camera 10 to the client terminal 60. The camera controlling server software 421 performs the camera connection, sending parameter information such as current pan, tilt angle, and zoom setting of the camera 10 to the client terminal 60.

Returning to FIG. 9, the discussion of the operation of the client terminal 60 is continued. In step S103, an attempt of the system connection is regarded as aborted when the response such as the video from the video sending terminal 20 and the parameter information is not normally received within a predetermined time, for some reason, for example, because of the network overloaded with traffic. The process goes to step S112, where an error message telling that the system connection is aborted is presented on the display screen of the bitmap display 135.

When the system connection is successful in step S103, the video receiving software 412 presents the video picked up by the camera 10 on the video display area 614 in accordance with the received video data. The map management software 413 reflects the received parameter information in the display of the camera icon 523 (the display status of the camera icon such as the orientation and color is modified according to conditions to be described later).

In step S104, the camera control client software 411 determines whether the user has moved the cursor 28a to the video display area 614 using the mouse 128 and has double-clicked the mouse 128. In other words, the camera control client software 411 determines whether to issue a request-for-control command for the camera 10 to the video sending terminal 20 corresponding to the camera icon 523.

Returning to the discussion of the operation of the video sending terminal 20, the request-for-control command for the camera 10 is received from the client terminal 60 in step S203. In step S204, the camera controlling server software 421 checks whether the control of the camera 10 is gained by another client terminal 60.

When it is determined in step S204 that no client terminals 60 have currently the control of the camera 10, specifically, when the content of a camera control state variable stored in the main memory 24 is empty, the process goes to step S205. The camera controlling server software 421 enters, in the camera control state variable, the name of the client terminal 60 which has issued the request-for-control command for the camera 10, issues, to the client terminal 60, the notice that the client terminal 60 has gained the control of the camera 10, and notifies all client terminals 60 included in the system connection list (in other words, the system connection is established and the video of the camera 10 is currently presented) held by the main memory 24, that the client terminal 60 has gained the control of the camera 10. When a request-for-control command is received from another client 60 in step S207, the process goes to step S208. The camera controlling server software 421 notifies the client terminal 60 currently having the control of the camera 10 of the name of another client terminal 60 which has issued the request-for-control command.

When it is determined in step S204 that the control of the camera 10 has already been gained by a client terminal 60, in other words, when the content of the camera control state variable stored in the main memory 24 is the name of that client terminal 60, the process goes to step S206. The camera controlling server software 421 notifies the client terminal 60, which has made the request for the control of the camera 10, of the name of the client terminal 60 which currently has the control of the camera 10, telling that the attempt to gain the control failed. The camera controlling server software 421 notifies the client terminal 60, which currently has the control of the camera 10, of the name of the client terminal 60 which has made the request for the control.

Returning to the discussion of the operation of the client terminal 60 shown in FIG. 9, after the reception of the notice from the video sending terminal 20, it is determined in step S105 that the attempt to gain the control of the camera 10 failed. In step S109, the camera control client software 411 updates the camera control state variable to "OCCUPIED". In step S110, the camera control client software 411 displays the name of the terminal client 60 currently having the control in the message display area 652. Furthermore, the camera control client software 411 displays the letter 'X' on the indicator 651 to indicate that the attempt to gain the control of the camera 10 failed. The map management software 413 displays the camera icon 523 in red to indicate that another client terminal 60 currently has the control.

When the acquisition of the control of the camera 10 by its own terminal is notified by the video sending terminal 20 in step S105, the camera control client software 411 determines that own client terminal has gained the control of the camera 10 corresponding to the camera icon 523, and updates the camera control state variable held in the main memory 124 to "OCCUPY" (step S106). In step S107, the camera control client software 411 displays on the message display area 652 the message to the effect that its own client terminal has gained the control of the camera 10, and displays the 'o' mark on the indicator 650. The map management software 413 displays the camera icon 523 in blue to indicate that its own client terminal 60 has gained the control of the camera 10.

Returning again to the discussion of the video sending terminal 20 shown in FIG. 10, the process goes to step S208 when a request-for-control command is received from another client terminal 60 other than the client terminal 60 currently having the control of the camera 10 in step S207. The camera controlling server software 421 notifies the client terminal currently having the control of the message to the effect that a request-for-control command for the camera 10 is received from another client terminal 60.

Returning to the discussion of the client terminal 60 shown in FIG. 9, the process goes to step S114 when the client terminal 60 receives, from the video sending terminal 20 of the video camera 10 currently under control, the message to the effect that a request-for-control command for the camera 10 is received from another client terminal 60, in step S113. The name of the client terminal 60 that has made the request for the control of the camera 10 is presented on the message display area 652. When there is no message that "a request-for-control command for the camera 10 is received from another client terminal 60", the state subsequent to the process step performed in step S107 is maintained.

When the heavy-outlined video display area 614 is double-clicked to release the control of the camera 10 corresponding to the camera icon 523 in step S115, the process goes to step S116. The camera control client software 411 notifies the video sending terminal 20 that the control has been released, and updates the camera control state variable to "RELEASE". Along with the update of the camera control state variable, the camera control client software 411 presents on the message display area 652 the message to the effect that the control has been released. In order to indicate that its own client terminal 60 relinquishes the control, the map management software 413 displays the camera icon 523 in white. The white camera icon 523 indicates that the camera 10 is not controlled by any client terminal 60.

In the operation of the video sending terminal 20 shown in FIG. 10, the process goes to step S210 when the release notice of the camera 10 is received in step S209. The camera control state variable is emptied, and the release of the camera 10 is notified all client terminals 60 registered in the system connection list stored in the main memory 24.

In step S117 in the flow diagram of the operation of the client terminal 60 shown in FIG. 9, the system connection of the video sending terminal 20 is terminated when the video display area 614 is dragged and dropped in the trash icon 632.

According to this embodiment, the video sending terminal 20 notifies the client terminal 60 currently having the control of the camera 10 of the name of the client terminal 60 which seeks the control of the camera 10, notifies the client terminal 60 having currently no control of the camera 10 of the name of the client terminal 60 having the control of the camera 10, and notifies the client terminal 60 having currently no control of the camera 10 that the client terminal 60 that had the control has released the control. The client terminals can quickly know the status of the control of the camera 10, and can transfer the control of the camera 10 between themselves. The contention for the control of the camera 10 is thus avoided.

This embodiment is a modification of the first embodiment. Even when another client terminal 60 currently has the control of the camera 10, its own terminal 60 can take over the control of the camera 10 from the client terminal 60 if its own terminal 60 has a higher priority. The construction of the system remains unchanged from that of the first embodiment. The discussion about it is not repeated here.

Figure 11:
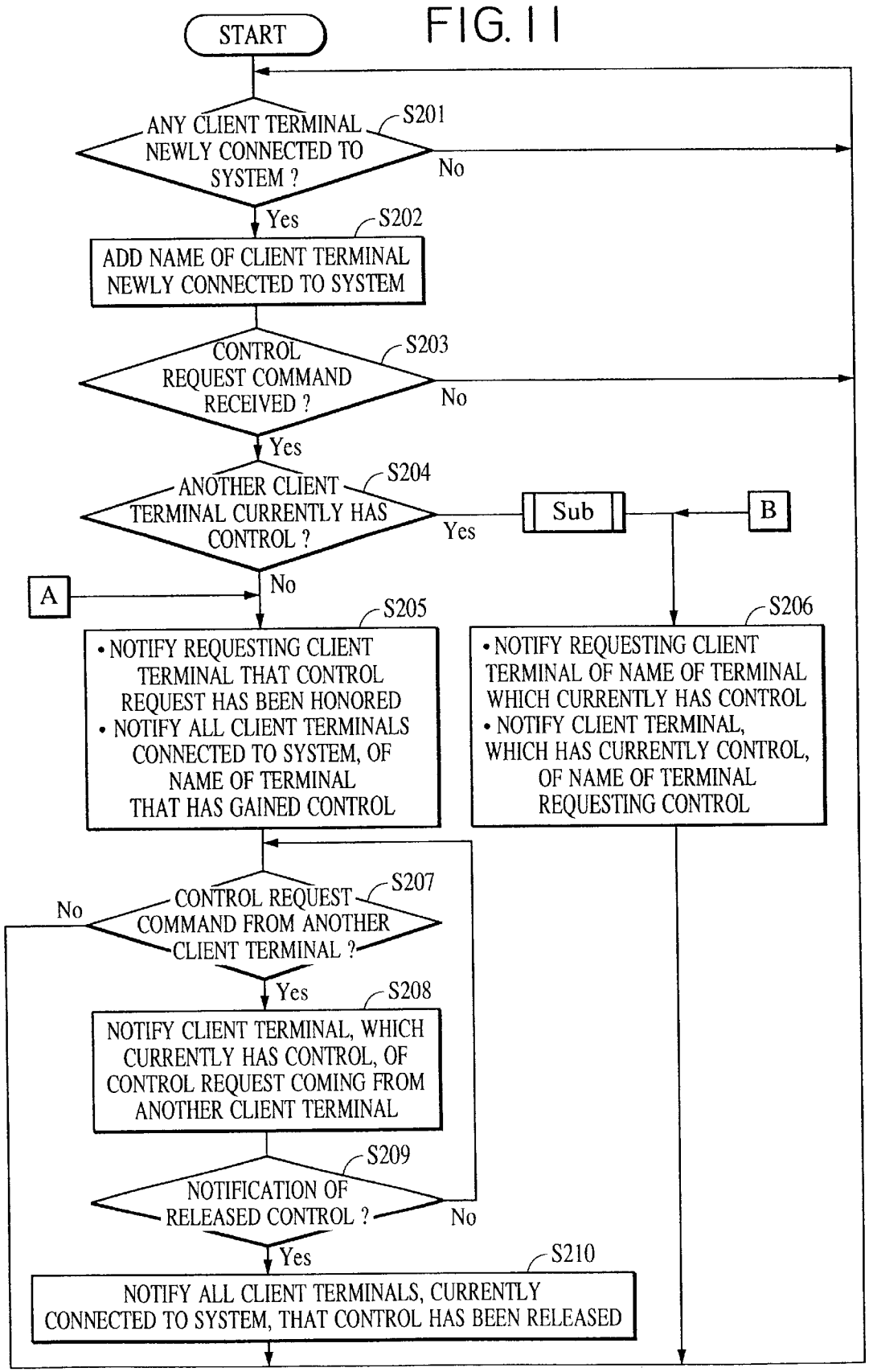
FIG. 11 is a flow diagram showing the operation of a video sending terminal in a modification of the first embodiment.
Figure 12:
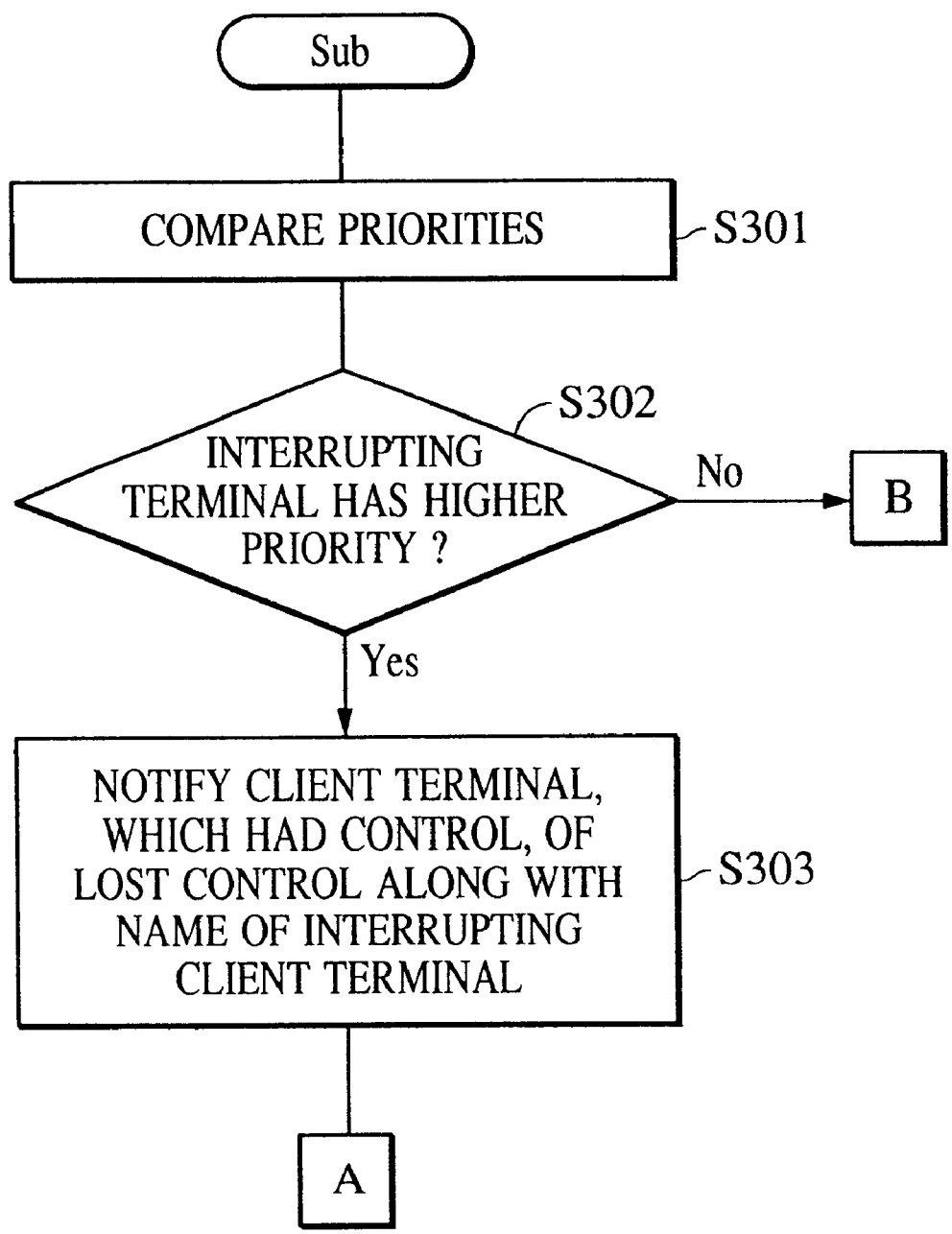
FIG. 12 is a flow diagram showing a subroutine of the routine of the video sending terminal in the modification of the first embodiment.

FIG. 11 is a flow diagram of the operation of the video sending terminal 20 of the modification of the first embodiment. FIG. 12 is a flow diagram showing a subroutine of the routine of the video sending terminal 20 in the modification of the first embodiment. In the flow diagram shown in FIG. 11, the subroutine is added to the process shown in the flow diagram in FIG. 10. In FIG. 11, steps identical to those with reference to FIG. 10 are designated with the same reference numerals and the discussion about them is not repeated here.

Referring to FIG. 11, a request-for-control command is received from a client terminal 60A in step S203. In step S204, for example, the content of the control state variable is not empty but is the name of the client terminal 60B. In other words, the client terminal 60B has the control of the camera 10. The subroutine shown in FIG. 12 is entered.

Referring to FIG. 12, in step S301, the camera controlling server software 421 determines the order of priority of the client terminal 60A that has requested for the control and the client terminal 60B having the control of the camera 10. To determine the order of priority, an unshown "client terminal list" is used. The client terminal list beforehand lists the names of the client terminals 60 connected to the network and their order of priority. The client terminal list may be stored in the main memory 24 or in a management server on the network.

Referencing the client terminal list to compare the client terminals 60A and 60B for the order of priority in step S302, the camera controlling server software 421 determines that the interrupting client terminal 60A has a lower priority, for example. The client terminal 60B having currently the control of the camera 10 continuously holds the control. The video sending terminal 20 returns to the main routine path prior to step S206 shown in FIG. 11.

If the camera controlling server software 421 determines that the interrupting client terminal 60A has a priority higher than the client terminal 60B, the process goes to step S303.

In step S303, the camera controlling server software 421 rewrites the control state variable to replace the name of the client terminal 60B with the name of the client terminal 60A. In other words, the control of the camera 10 is transferred to the interrupting client terminal 60A. Furthermore, the camera controlling server software 421 notifies the client terminal 60A, which lost the control of the camera 10, of the cancellation of the control of the camera 10 together with the name of the client terminal 60A. In accordance with the cancellation notice of the control of the camera 10 from the video sending terminal 20, the client terminal 60B presents the message to that effect on the message display area 652. The video sending terminal 20 returns to the main routine path prior to step S205 in FIG. 11.

As described above, if its own client terminal 60 has a higher priority, the own client terminal 60 interrupts to take over the control even if another client terminal 60 already has the control of the camera 10. Since the interrupted client terminal 60 is notified of the name of own client terminal 60 which interrupted, the trouble between the client terminals 60 in connection with the control of the camera 10 is thus less likely.

A second embodiment of the present invention is now discussed.

In the first embodiment, the video sending terminal 20 notifies predetermined client terminals 60 of the name of the client terminal 60 which has gained, requested or released the control of the camera 10. In the second embodiment, the client terminal 60 itself which has gained, requested or released the control of the camera 10 directly notifies the predetermined client terminals 60. The construction of the camera control system of the second embodiment remains unchanged from that of the first embodiment and the discussion about it is not repeated here.

Figure 13:
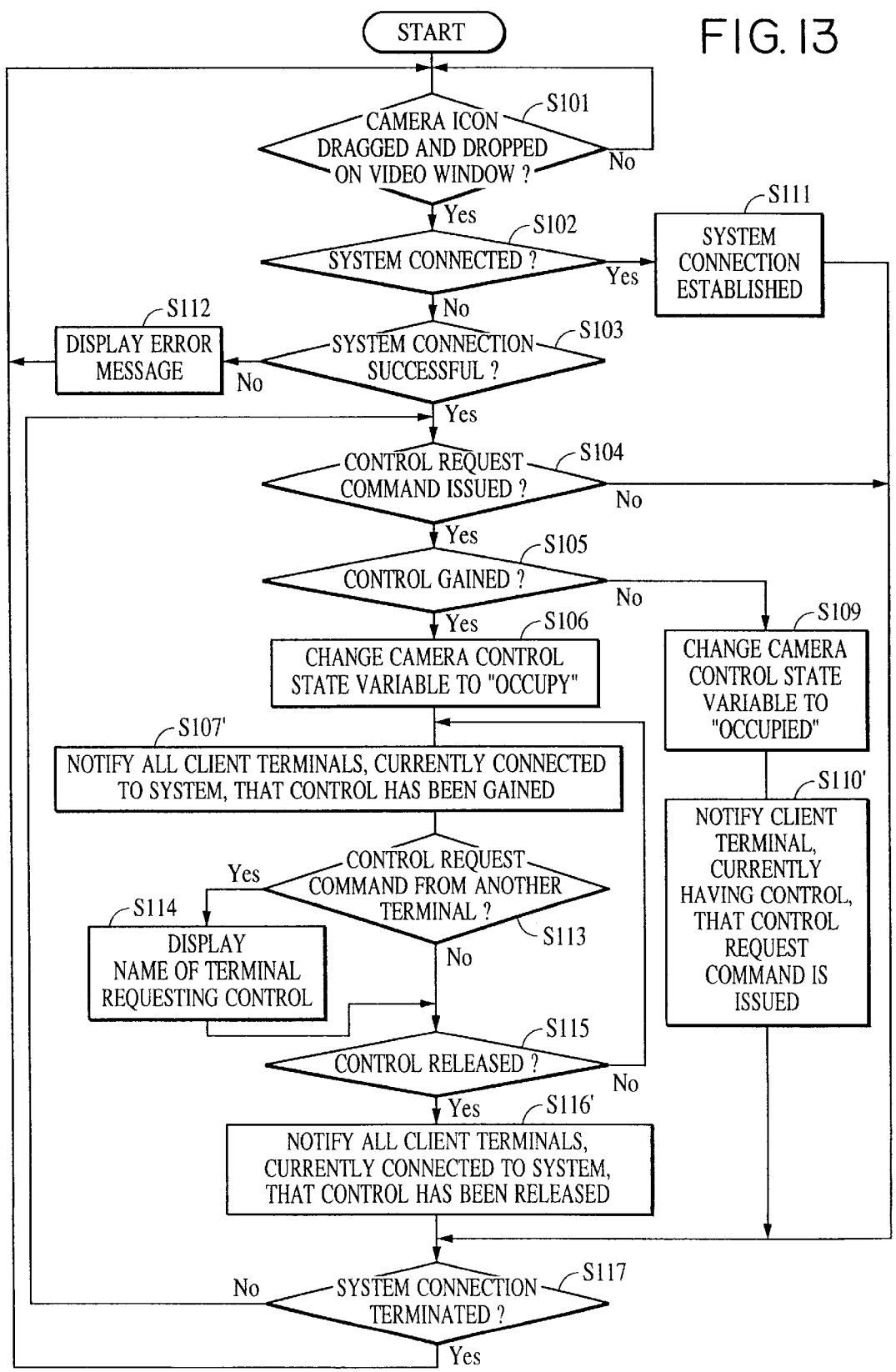
FIG. 13 is a flow diagram showing the operation of a client terminal in a second embodiment of the present invention.
Figure 14:
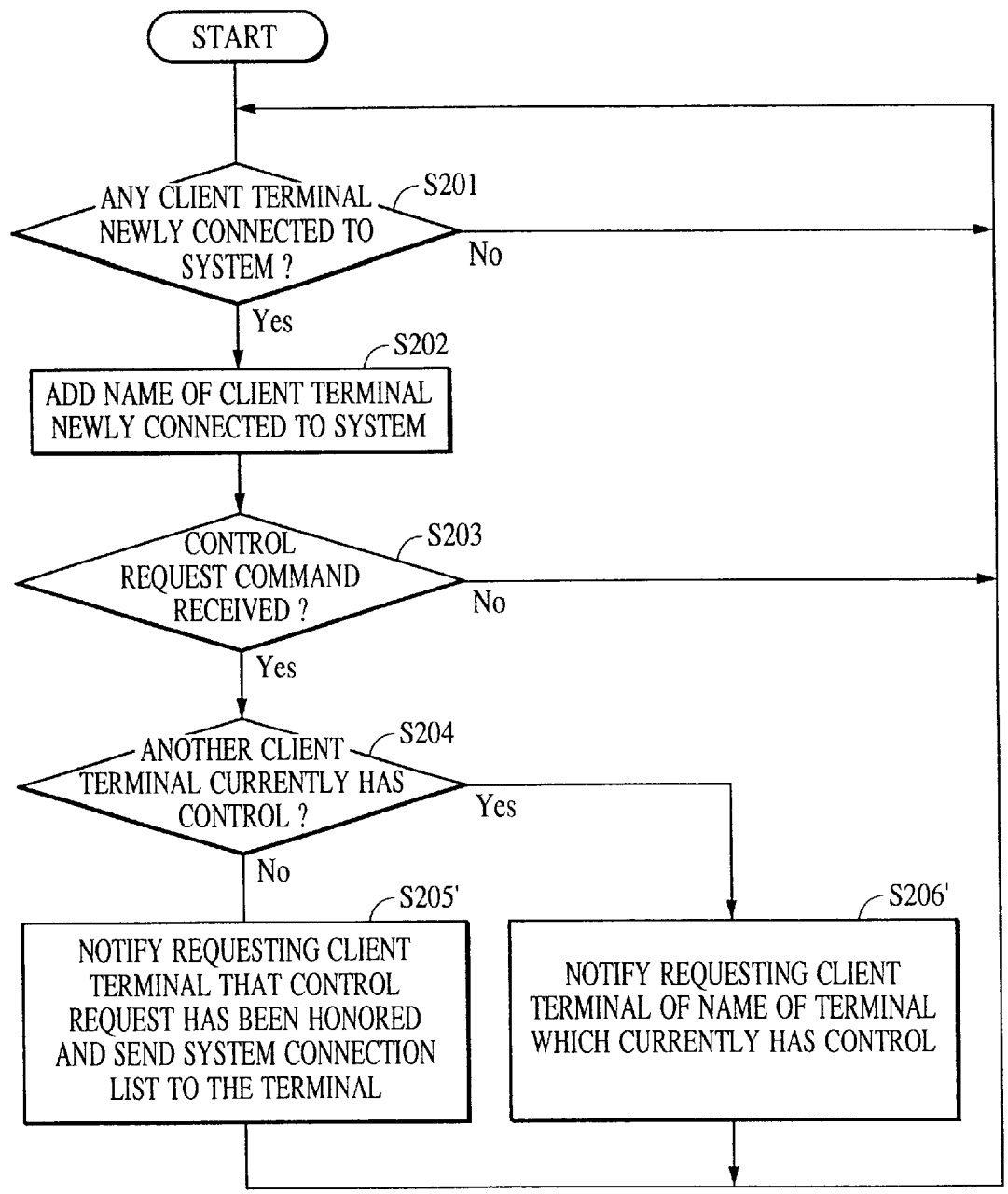
FIG. 14 is a flow diagram showing the operation of a video sending terminal in the second embodiment.

FIG. 13 is a flow diagram of the operation of the client terminal 60 in the second embodiment. FIG. 14 is a flow diagram of the operation of the video sending terminal 20. To execute the processes shown in FIG. 13 and FIG. 14, the software programs stored in the storage device are downloaded to respective terminals and the CPUs execute the respective processes under the control of the software programs. Process steps identical to those described with reference to FIG. 9 and FIG. 10 are designated with the same step numbers and the discussion about them is not repeated here.

The process in response to a request for the control of the camera 10 sought by a client terminal 60 is now discussed.

In step S204 shown in FIG. 14, if no client terminal 60 now has the control of the camera 10, in other words, the camera control state variable stored in the main memory 24 is empty, the process goes to step S205'. The camera controlling server software 421 enters, into the control state variable, the terminal name of the client terminal 60 which has made a request for the control of the camera 10 and issues a notice of acquisition of the control of the camera 10 to the client terminal 60. Furthermore, the camera controlling server software 421 sends, to the client terminal 60 which gained the control, a system connection list already discussed in connection with the first embodiment, together with the acquisition notice of the control of the camera 10.

When any client terminal 60 has the control of the camera 10 in step S204, namely, the content of the camera control state variable stored in the main memory 24 is the terminal name of another client terminal 60, the process goes to step S206. The camera controlling server software 421 notifies the client terminal 60, which has made the request for the control of the camera 10, of the terminal name of the client terminal 60 which currently has the control of the camera 10, thus notifying that the attempt to gain the control of the camera 10 has failed.

The operation of the client terminal 60 is now discussed referring to FIG. 13. When the client terminal 60 has failed to gain the control of the camera 10 in step S105, the process goes to step S109. The camera control client software 411 updates the camera control state variable to "OCCUPIED".

In step S110', the camera control client software 411 notifies the client terminal 60, which currently has the control of the camera 10, that its own client terminal has issued a request-for-control command. Along with the update of the camera control state variable, the camera control client software 411 displays, on the message display area 652, the name of the client terminal 60 which has currently the control of the camera 10, and further causes the indicator 651 to present the letter 'X' to indicate the failure to gain the control of the camera 10. The map management software 413 displays the camera icon 523 in red to indicate that the control of the camera 10 is now gained by another client terminal 60.

When the client terminal 60 receives the notice of acquisition of the control of the camera 10 from the video sending terminal 20 in step S105, the camera control client software 411 determines that the client terminal 60 has gained the control of the camera 10 corresponding to the camera icon 523, and updates the camera control state variable stored in the main memory 124 to "OCCUPY" in step S106.

Along with the update of the camera control state variable, the camera control client software 411 references the system connection list sent by the video sending terminal 20, and notifies all client terminals 60 registered in the system connection list that its own client terminal 60 has gained the control of the camera 10 in step S107'. Upon receiving the notice of the control acquisition, each client terminal 60 registered in the system connection list displays, on the message display area 652, the name of the client terminal 60 which has gained the control, and displays the corresponding camera icon 523 in red.

In step S107', the camera control client software 411 in its own client terminal 60 that has gained the control of the camera 10 also displays, on the message display area 652, the message that its own client terminal has gained the control of the camera 10, while causing the indicator 650 to present the circle mark. The map management software 413 displays the camera icon 523 in blue to indicate that its own client terminal 60 has now the control of the camera 10.

Discussed next is the operation of the client terminal 60 of releasing the control of the camera 10.

When the control of the camera 10 is released in step S115, the camera control client software 411 goes to step S116'. The camera control client software 411 updates the camera control state variable to "RELEASE", references the system connection list sent by the video sending terminal 20 and notifies all client terminals 60 registered in the system connection list that its own client terminal has released the control of the camera 10. The system connection list sent by the video sending terminal 20 is stored in the main memory 124.

In the second embodiment, as discussed above, the client terminal 60 itself which has gained, requested or released the control of the camera 10 directly notifies the predetermined client terminals 60. The work load on the video sending terminal 20 is lightened without affecting the advantage of the first embodiment.

A third embodiment of the present invention is now discussed.

In the third embodiment, the control of the camera 10 is assigned to each control command using a camera control panel 640. The control of the camera 10 is released on a per control command basis. Specifically, the third embodiment is a camera control system in which the video display area on the video display window 600 is switched to designate a camera 10 to which a control command is to be output, and the camera control panel 640 is used to generate a single control command.

Figure 15:
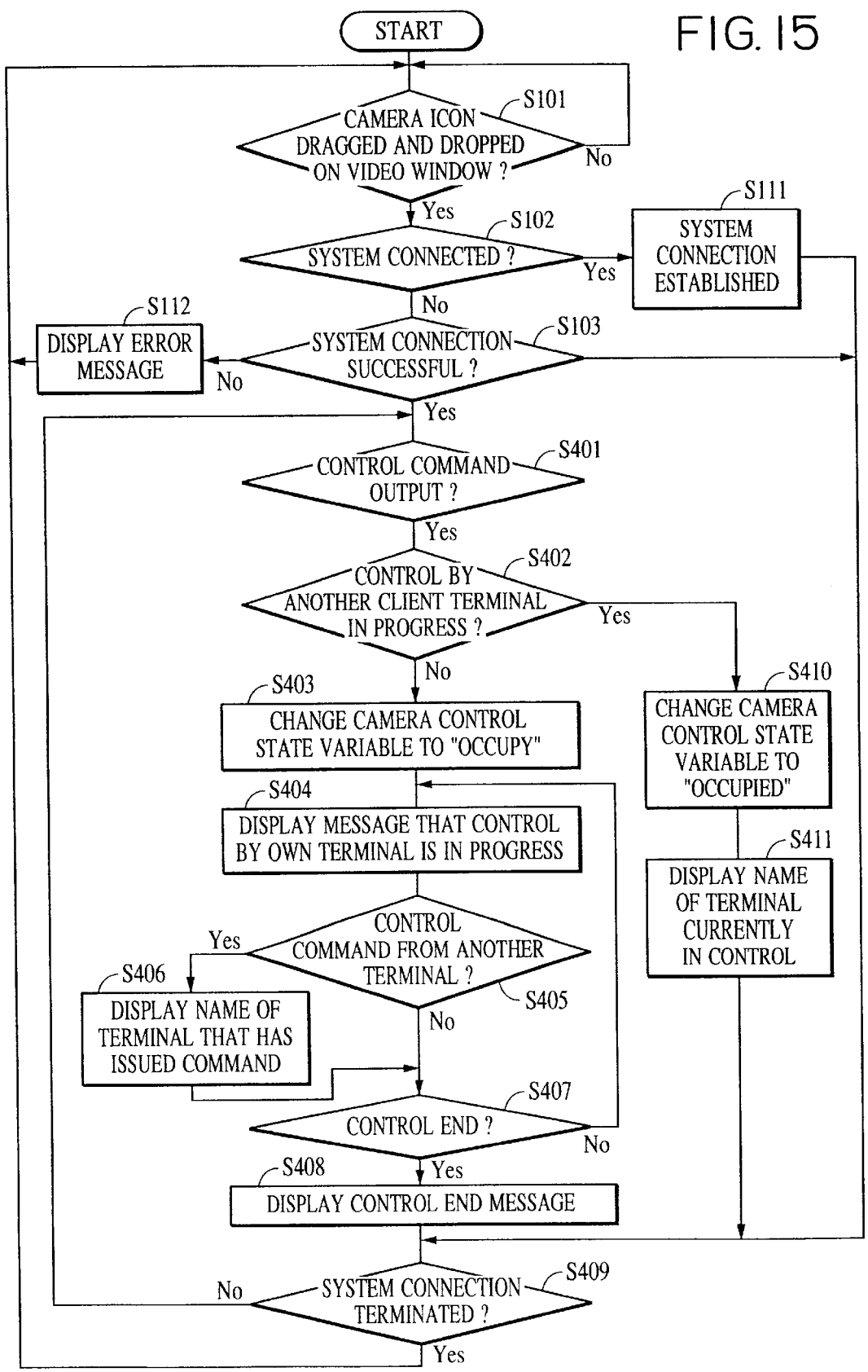
FIG. 15 is a flow diagram showing the operation of a client terminal in a third embodiment of the present invention.
Figure 16:
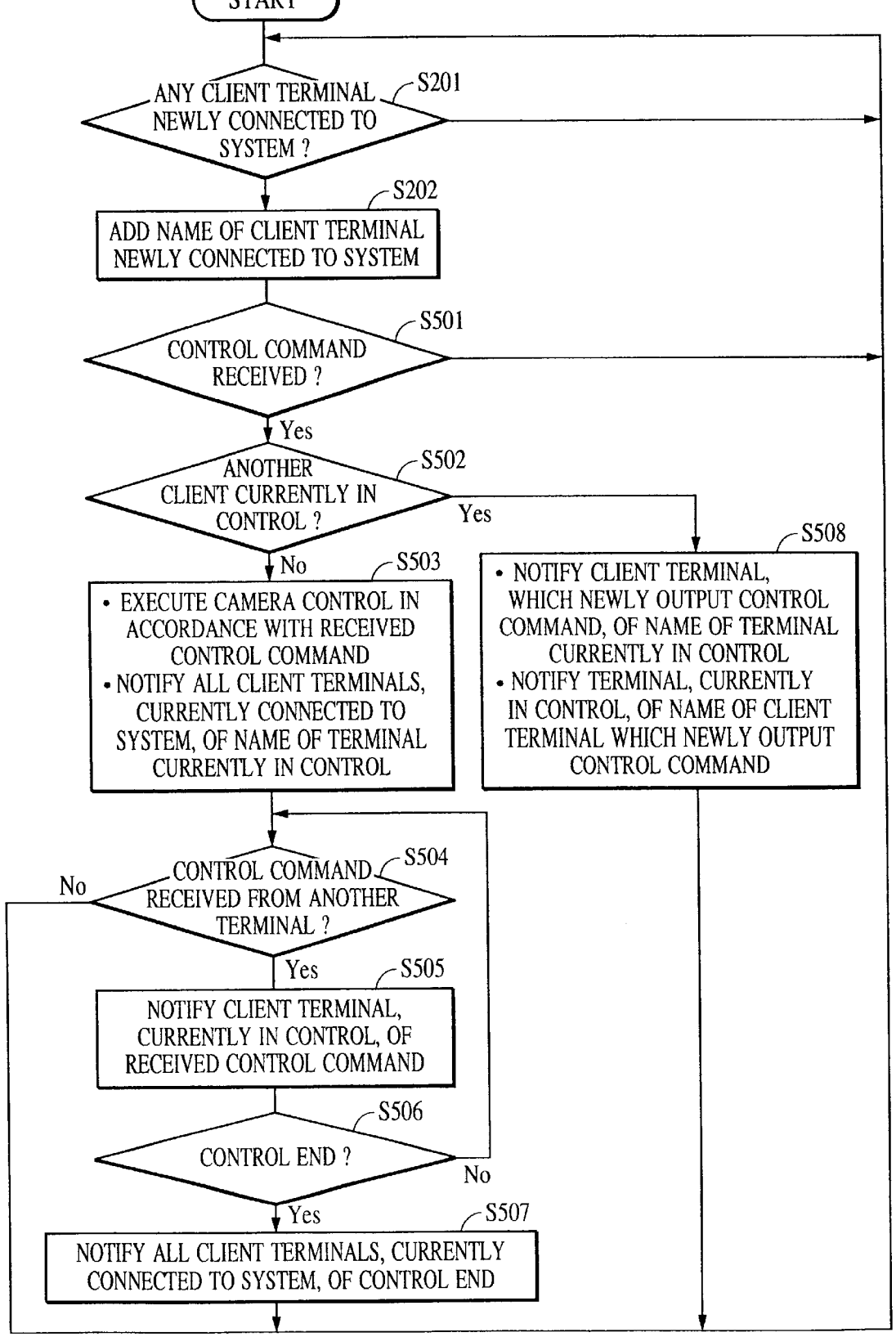
FIG. 16 is a flow diagram showing the operation of a video sending terminal in the third embodiment.

FIG. 15 is a flow diagram of the operation of the client terminal 60. FIG. 16 is a flow diagram of the operation of the video sending terminal 20. In FIG. 15 and FIG. 16, process steps identical to those described with reference to FIG. 9 and FIG. 10 are designated with the same step numbers and the discussion about them is not repeated here.

Now, a camera control command is issued using the camera control panel 640 to the video sending terminal 20.

In step S401 in the flow diagram of the operation of the client terminal 60 shown in FIG. 15, a single control command is generated using the camera control panel 640. The control command is output to the video sending terminal 20 of the designated camera 10.

In step S501 in the flow diagram of the operation of the video sending terminal 20 shown in FIG. 16, the control command output by the client terminal 60 is received. In step S502, the camera controlling server software 421 checks whether another client terminal 60 now controls the camera 10. When the camera 10 is not controlled by any client terminal 60, in other words, when the content of the camera control state variable in the main memory 24 is empty, the process goes to step S503.

In step S503, the camera controlling server software 421 enters, into the control variable, the terminal name of the client terminal 60 which has output the control command for the camera 10, and controls the camera 10 in response to the control command. Furthermore, the camera controlling server software 421 notifies all client terminals 60 registered in the system connection list (namely, in the state of the system connection) that the client terminal 60 currently controls the camera 10.

When the camera 10 is controlled by another client terminal 60 in step S502, in other words, when the content of the camera control state variable stored in the main memory 24 is the name of another client terminal 60, the process goes to step S508. The camera controlling server software 421 notifies the client terminal 60, which has issued the control command for the camera 10, of the name of the client terminal 60 which currently controls the camera 10, notifying that the attempt to control the camera 10 failed. The camera controlling server software 421 notifies the client terminal 60, which currently has the control of the camera 10, of the name of the client terminal 60 which has sought the control.

Returning to the discussion of the operation of the client terminal 60 in FIG. 15, the client terminal 60 receives the notice from the video sending terminal 20 in step S402. When the camera control client software 411 determines that the control of the camera 10 is not gained, it goes to step S410 and updates the camera control state variable to "OCCUPIED". In step S411, the camera control client software 411 displays, on the message display area 652, the name of the client terminal 60 which currently controls the camera 10. The camera control client software 411 further causes the indicator 651 to present the letter 'X' to indicate the failure to gain the control of the camera 10. The map management software 413 displays the camera icon 523 in red to indicate that the control of the camera 10 is now gained by another client terminal 60.

In step S402, the camera control client software 411 determines that the control of the camera 10 is executed, when the camera 10 is controlled in accordance with the control command from the video sending terminal 20. The camera control client software 411 updates the camera control state variable stored in the main memory 124 to "OCCUPY" in step S403.

In step S404, the camera control client software 411 displays on the message display area 652 the message to the effect that own client terminal has gained the control of the camera 10, and displays the 'o' mark on the indicator 650. The map management software 413 displays the camera icon 523 in blue to indicate that own client terminal 60 has gained the control of the camera 10.

Returning again to the discussion of the video sending terminal 20 shown in FIG. 16, the process goes to step S505 when a control command is received from another client terminal 60 other than the client terminal 60 currently controlling the camera 10 in step S504. The camera controlling server software 421 notifies the client terminal 60 currently controlling the camera 10 of the message to the effect that a control command for the camera 10 is received from another client terminal 60.

Returning to the discussion of the client terminal 60 shown in FIG. 15, the process goes to step S406 when the client terminal 60 receives, from the video sending terminal 20 of the video camera 10 currently under control, the message to the effect that a control command for the camera 10 is received from another client terminal 60, in step S405. In response to the notice from the video sending terminal 20, the name of the client terminal 60 that has output the control command of the camera 10 is presented on the message display area 652. When there is no message to the effect that a control command for the camera 10 is received from another client terminal 60, the state subsequent to the process step performed in step S404 is maintained.

Returning to the flow diagram of the operation of the video sending terminal 20 shown in FIG. 16, the control of the camera 10 in accordance with a single control command ends in step S506. In step S507, the camera control state variable is emptied, and all client terminals 60 registered in the system connection list are notified of the control end.

Returning to the flow diagram of the operation of the client terminal 60 shown in FIG. 15, the process goes to step S408 when the client terminal 60 receives the control end of the camera 10 from the video sending terminal 20 in step S407. The camera control client software 411 updates the camera control state variable to "RELEASE" and displays, on the message display area 652, the message indicative of the control end. In order to indicate that own client terminal 60 terminates the control, the map management software 413 displays the camera icon 523 in white. The white camera icon 523 indicates that the camera 10 is not controlled by any client terminal 60.

As described above, the control of the camera 10 is given on a per control command basis. The client terminal 60 can quickly know the control status of the camera 10. The control of the camera 10 is thus transferred among the client terminals 60 and the trouble in connection with the control is thus less likely.

A fourth embodiment of the present invention is now discussed.

Like the third embodiment, the fourth embodiment allows the client terminal 60 to have the control of the camera 10 on a per control command basis with the camera control panel 640. The fourth embodiment is different from the third embodiment in that a client terminal 60 which has controlled the camera 10, released the camera 10 or output a control command, directly notifies a predetermined client terminal 60.

Figure 17:
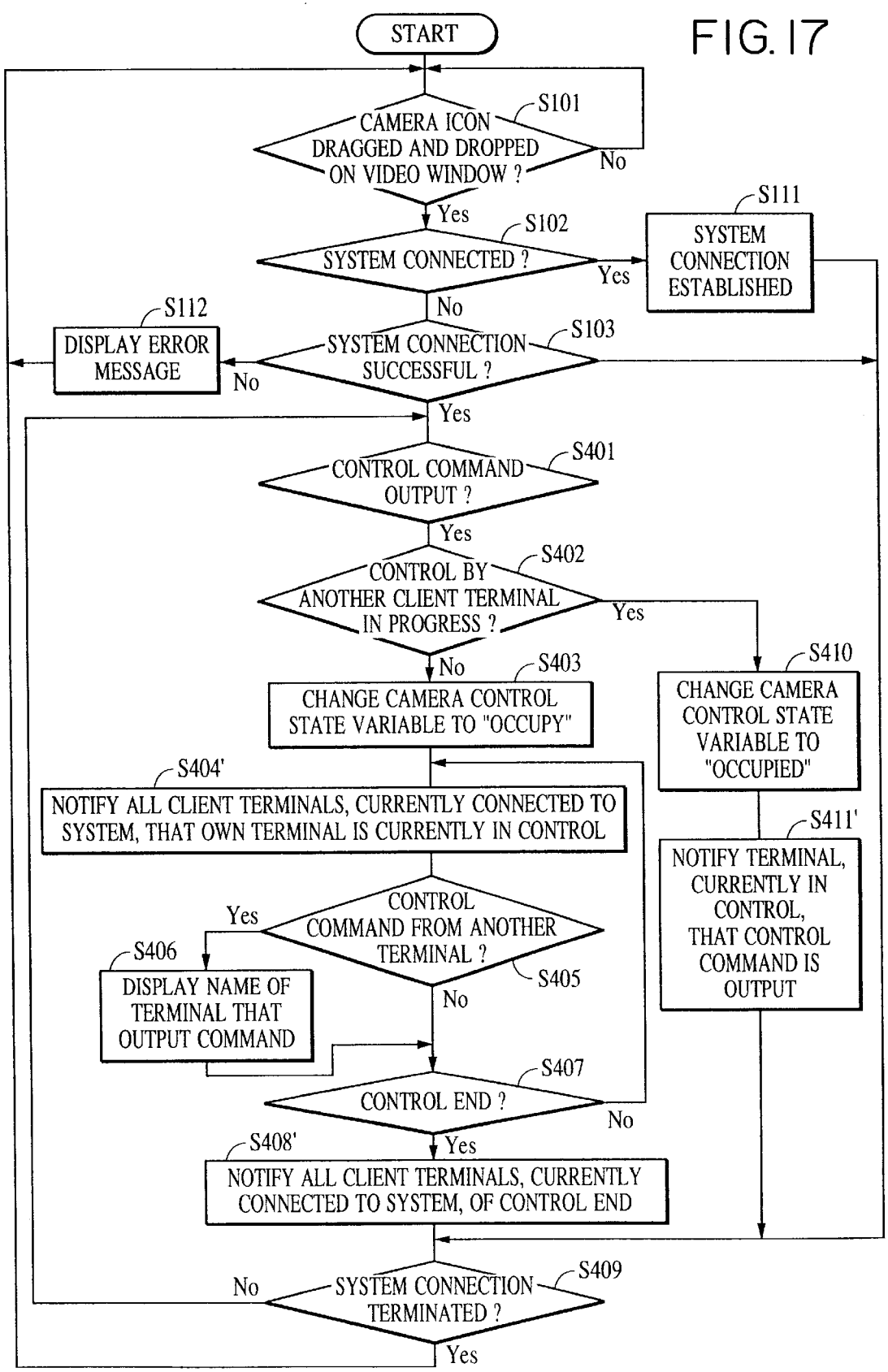
FIG. 17 is a flow diagram showing the operation of a client terminal in a fourth embodiment of the present invention.

FIG. 17 is a flow diagram of the operation of the client terminal 60 in the fourth embodiment. FIG. 18 is a flow diagram of the operation of the video sending terminal 20. To execute the processes shown in FIG. 17 and FIG. 18, the software programs stored in the storage device are downloaded to respective terminals and the CPUs execute the respective processes under the control of the software programs. Process steps identical to those already described are designated with the same step numbers and the discussion about them is not repeated here.

Discussed now is the operation of the client terminal 60 which outputs a control command.

When the camera 10 is not controlled by any client terminal 60, in other words, when the content of the camera control state variable stored in the main memory 24 is empty, the process goes to step S503'. The camera controlling server software 421 enters, into the control variable, the terminal name of the client terminal 60 which has output the control command for the camera 10, and notifies the client terminal 60 that the control of the camera 10 is in progress in accordance with the output control command. The camera controlling server software 421 sends the system connection list already described in connection with the first embodiment along with the above notice to the client terminal 60.

When the camera 10 is controlled by another client terminal 60 in step S502, in other words, when the content of the camera control state variable stored in the main memory 24 is the name of another client terminal 60, the process goes to step S508'. The camera controlling server software 421 notifies the client terminal 60, which has issued the control command for the camera 10, of the name of the client terminal 60 which currently controls the camera 10, notifying that the attempt to control the camera 10 failed.

The operation of the client terminal 60 is now discussed referring to FIG. 17. When the camera control client software 411 determines, based on the notice from the video sending terminal 20, that the camera 10 is controlled, it goes to step S410 and updates the camera control state variable to "OCCUPIED".

In step S411', the camera control client software 411 notifies the client terminal 60 currently having the control that a request-for-control command has been issued. From the notice from the video sending terminal 20, the camera control client software 411 displays, on the message display area 652, the name of the client terminal 60 which currently controls the camera 10. The camera control client software 411 further causes the indicator 651 to present the letter 'X' to indicate that its own client terminal failed to gain the control of the camera 10. The map management software 413 displays the camera icon 523 in red to indicate that the control of the camera 10 is now gained by another client terminal 60.

When the client terminal 60 is notified by the video sending terminal 20 that the control of the camera 10 is not in progress in step S402, the camera control client software 411 determines that the camera 10 is not controlled. The camera control client software 411 updates the camera control state variable to "OCCUPY".

Along with the update of the camera control state variable, the camera control client software 411 references the system connection list sent by the video sending terminal 20, and notifies all client terminals 60 registered in the system connection list that its own client terminal 60 controls the camera 10 in step S404'. Upon receiving the notice of the control acquisition, each client terminal 60 registered in the system connection list displays, on the message display area 652, the name of the client terminal 60 which has gained the control, and displays the corresponding camera icon 523 in red.

In step S404', the camera control client software 411 displays on the message display area 652 the message to the effect that its own client terminal currently controls the camera 10, and displays the circle mark on the indicator 650. The map management software 413 displays the camera icon 523 in blue to indicate that its own client terminal 60 controls the camera 10.

The operation of the client terminal 60 of terminating the control of the camera 10 is now discussed.

When the control of the camera 10 ends in step S407, the camera control client software 411 goes to step S408'. The camera control client software 411 updates the camera control state variable to "RELEASE", references the system connection list sent by the video sending terminal 20, and notifies all client terminals 60 registered in the system connection list that the control of the camera 10 has been terminated. The system connection list sent by the video sending terminal 20 is stored in the main memory 124.

As described above, since the client terminal 60 which has controlled the camera 10, released the camera 10 or output a control command, directly notifies a predetermined client terminal 60, the work load on the video sending terminal 20 is lightened.

In the preceding embodiments, the color of the camera icon is changed to indicate the status of the control of the camera 10 corresponding to the camera icon. The present invention is not limited to the use of color indication. It is important to let the user of the client terminal 60 know the control status of the video camera 10. The control status of the camera 10 may be indicated by changing the configuration of the camera icon, or the name of the client terminal 60 having the control of the camera 10 may be presented on screen in the vicinity of the camera icon.

In the preceding embodiments, the name of the client terminal 60 is notified to each client terminal 60 as necessary. The name of the client terminal is replaced with a user name without any problems in the present invention.

Not only the user name but also the image of the user's face may be sent to the client terminal 60.

A fifth embodiment of the present invention is now discussed. In the fifth embodiment, the image of the face of a user is used to indicate that another client terminal is connected to the camera.

Referring to FIGS. 19A and 19B, the video of a camera 10 corresponding to a camera icon 523 is presented on a video display area 614 when the camera icon 523 is dragged and dropped in the video display area 614.

To display the video of the camera 10 on screen, the user selects one of the camera icons 521–524 indicating the cameras 10 on the map on the map window 500, and drags and drops it onto any of the video display areas 610–620 on the video display window 600.

The operation for executing the camera control is now discussed. The user moves the cursor 28*a* using a mouse 128 to the video display area having a video of a video camera 10 the user wants to control, among the video display areas 610–620 presented on screen, and clicks the mouse there. A camera control window 640 then appears, and the corresponding camera 10 is now ready to be controlled (the control for panning, tilting and zooming actions of the camera that originates the video output). To indicate that the camera is controllable, the clicked video display area is surrounded with a yellow outline. If the yellow-outlined video display area is clicked again, the camera cannot be controlled any longer (the control is released). In the fifth embodiment, while one client terminal 60 has the control, another client terminal 60 cannot gain the control.

Designated 69*a*, 69*b*, 69*c* and 69*d* are respective buttons for controlling the direction of the camera to the upward, to the downward, to the left and to the right. A button 72*a* adjusts the camera 10 to zoom to the telephoto side and a button 72*b* adjusts the camera 10 to zoom to the wideangle side.

The image of the face 71 is presented on the video display area 614. The image of the face 71 is the face image of a user of another client terminal 60 which concurrently receives and displays the video presented on the video display area 614.

When there is another client terminal 60 which displays the same video on screen, the face image of the user who also monitors the video on another client terminal 60 is presented on the video display area. When a plurality of users receive from the same camera, the images of the users are all presented on screen.

Since two images of faces are presented as shown in FIG. 19, the number of client terminals 60 receiving the video presented on the video display area 614 is two. The image of the user of the client terminal 60 currently having the control of the camera 10 is surrounded by a red outline. Referring to FIG. 19, the user whose face image is presented on the left-hand side has now the control of the camera 10.

When the mouse 128 is clicked with the cursor 28*a* on the display area of the face image 71, a networked conference window appears as below.

Figure 20:
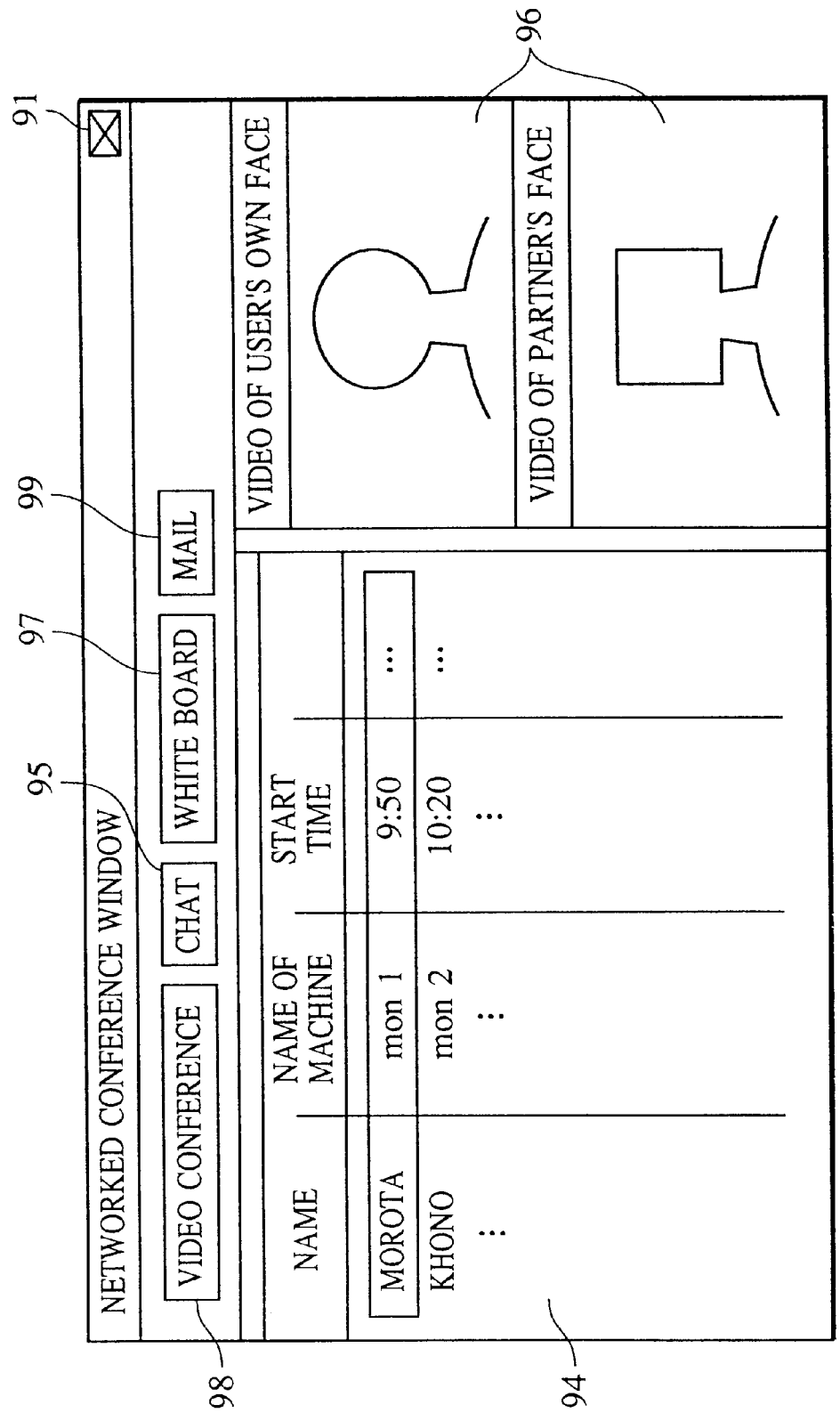
FIG. 20 shows one example of a networked conference window.

FIG. 20 shows a networked conference window by selecting the face image 71.

Listed in a user list area 94 are the names of client terminals 60 receiving the same video, the names of users monitoring the respective terminals, and more detailed information about the client terminals 60 receiving the same video.

A video conference display area 96 presents the images of face of video conferees when a video conference is conducted. A conferee uses a video conference button 98 to start a video conference, and selects a partner (client terminal 60) of the conference from the user list area 94. The partner (client terminal 60) selected from the user list area 94 is outlined. A chat button 95 is used to start a chat through text exchange. A white board button 97 is used to start a teleconference using a shared white board. A mail button 99 is used to open a mail create window to transmit mail to a selected partner.

The video conference, the chatting, the shared white board teleconference, and the mail create system are known ones and the discussion about them is skipped here. The video conference program, the chatting program, the shared white board teleconference program and electronic mail program may be embedded in the video receiving software 412 in each terminal 60, or independent programs are called each time. By selecting the video conference button 98, the chat button 95, the white board button 97, or the mail button 99, the selected program starts up, and communications are carried out based on the video from the same camera.

Figure 21:
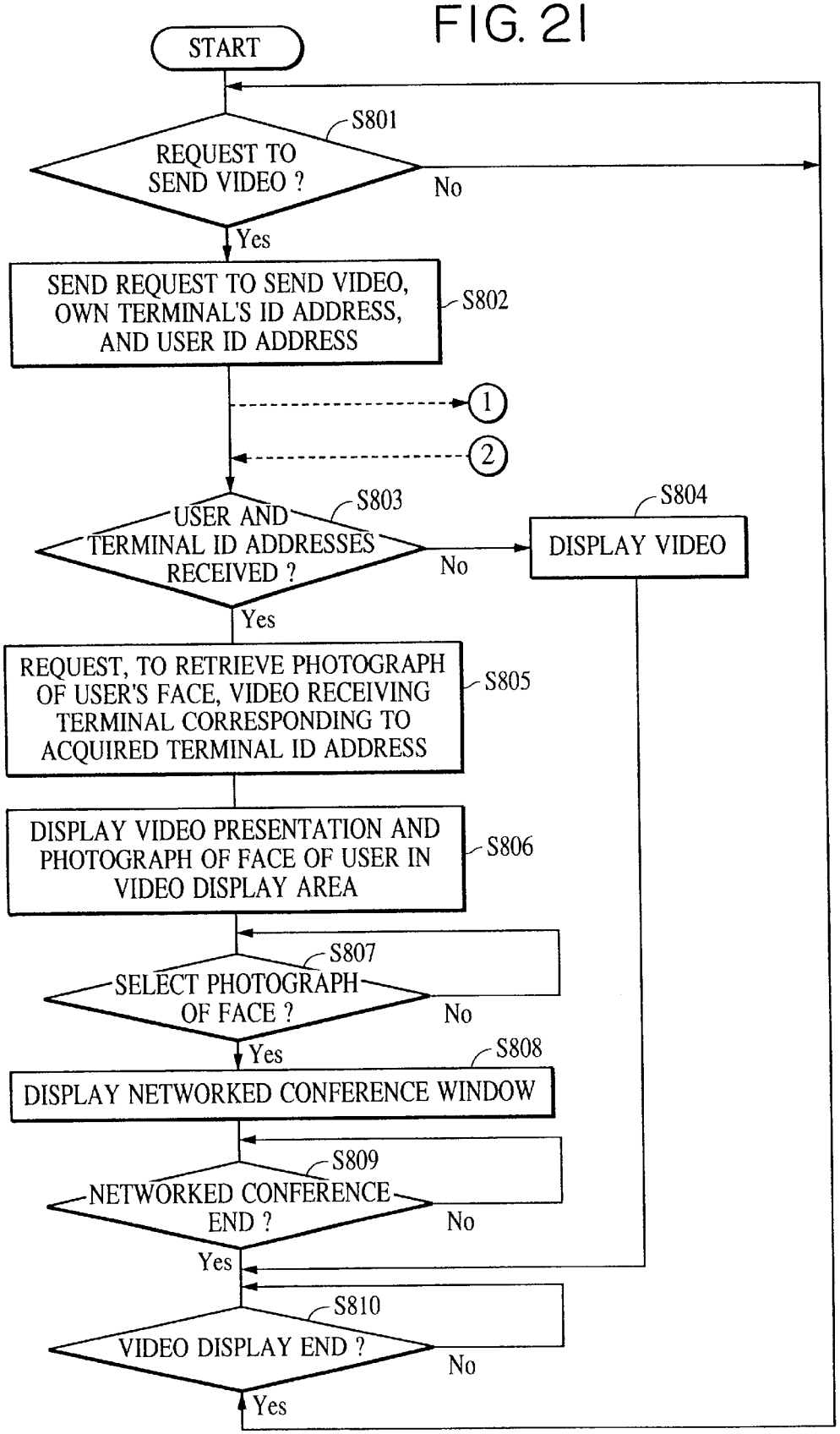
FIG. 21 is a flow diagram showing the operation of the client terminal.
Figure 22:
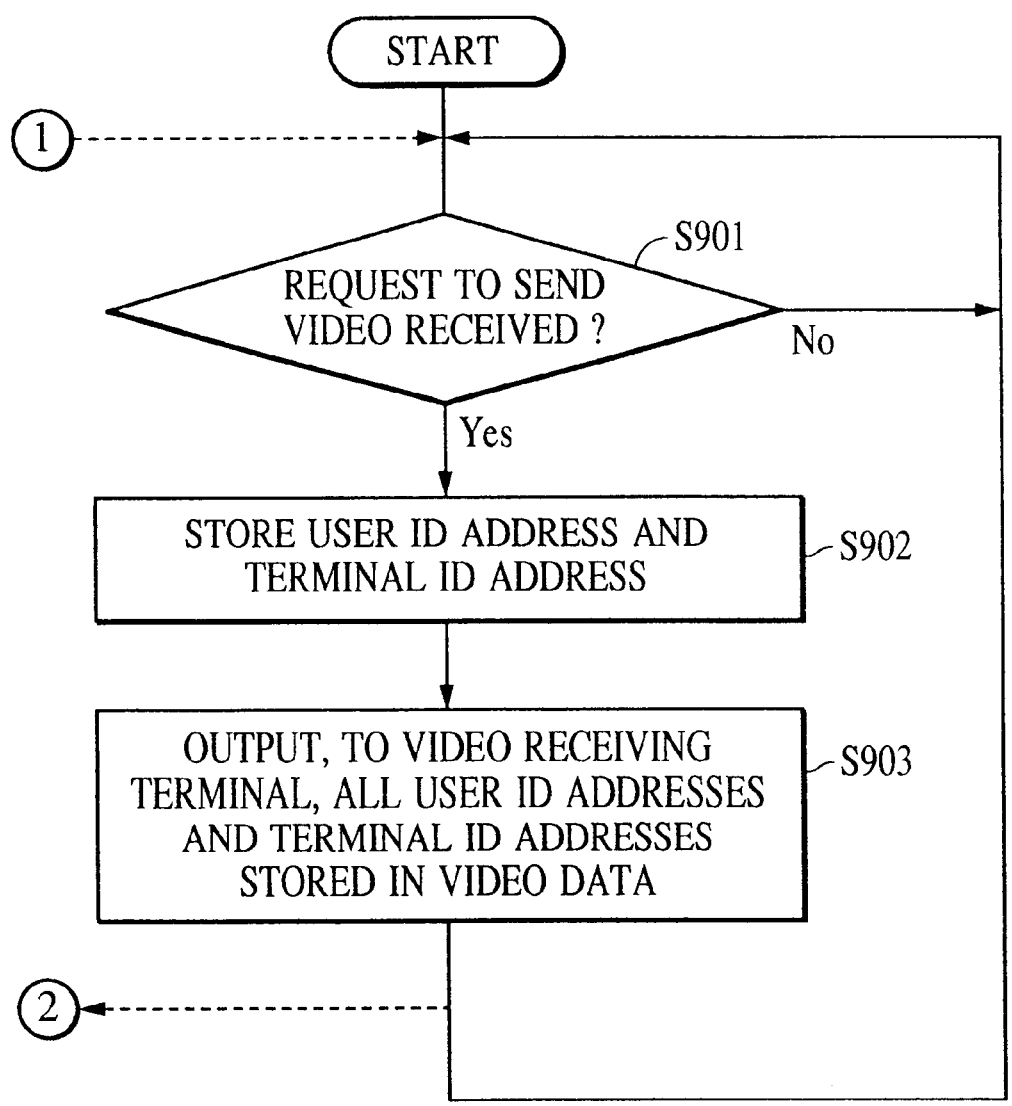
FIG. 22 is a flow diagram showing the operation of the video sending terminal.

FIG. 21 is a flow diagram of the operation of the client terminal 60 according to the fifth embodiment. FIG. 22 is a flow diagram of the operation of the video sending terminal 20 according to the fifth embodiment. Referring to FIG. 21 and FIG. 22, the fifth embodiment of the camera control system is now discussed.

When a desired one of the camera icons 521–524 is dragged and dropped in any of video display areas 610–620 in step S801, the process goes to step S802. The video receiving software 412 sends, to the video sending terminal 20 connected to the camera corresponding to the dragged and dropped camera icon, the ID address of its own client terminal 60 currently being operated, and the ID address of the user, along with a request to send video.

In step S901 in the flow diagram of the video sending terminal 20 shown in FIG. 22, the request to send video from the client terminal 60 is received in step S901. In step S902, the video sending software 422 stores, in the main memory 24, the ID address of the client terminal 60 now being operated, and the ID address of the user, coming in along with the request to send video.

In step S903, the video sending software 422 sends the video data picked up by the camera 10 along with the ID addresses of all client terminals 60 and the ID addresses of the users, beforehand stored in the main memory 24, to the client terminal 60 which has made the request to send video (and also notifies that the control of the camera 10 is gained, if its own client terminal has gained control). The client terminal 60 can know other client terminals 60 currently receiving the video picked up by the camera 10 and the users who monitor them, by receiving these data (the ID addresses of all client terminals 60 and the ID addresses of the users, beforehand stored in the main memory 24). The video sending software 422 outputs the ID address of a client terminal 60 newly stored and the ID address of the user, to the client terminal 60 which already receives the video picked up the camera 10, telling the inclusion of a new terminal receiving the video.

Returning to the flow diagram in FIG. 21, when the ID address of the client terminal 60 receiving the video from the same camera and the ID address of the user are not received along with the video data, in step S803, the process goes to step S804. The video sending software 422 displays the received video data on the video display area designated in step S801. When the ID address of the client terminal 60 receiving the video from the same camera and the ID address of the user are received along with the video data in step S803, the process goes to step S805.

The camera controlling server software 421 requests each of the client terminals 60 corresponding to the received ID addresses to retrieve the video data of the user corresponding to the user ID address, such as the image of the user. When the camera controlling server software 421 receives the video data of the face of the user from each client terminal 60 in step S806, the camera controlling server software 421 displays the received image of the face of the user along with the video from the camera received from the video sending terminal 20, on the video display area designated in step S801.

When one of face images 71 displayed is selected by clicking the mouse 128 with the cursor 28*a* on that desired face image in step S807, the process goes to step S808. The networked conference window as shown in FIG. 20 is presented on screen, and communications with the client terminal 60 of the user whose image of face is selected as described above are now enabled.

To terminate the networked conference window in step S809, the button 91 is clicked. To terminate the display of the video in step S810, the one of the video display areas 610–620 to be terminated is dragged and dropped in the trash icon 632.

In the camera control system of the fifth embodiment, as described above, the face image data of the user who monitors the video from the same camera 10 is displayed on screen. The user can know the client terminal 60 of the user who has the control of the camera 10. Communications with the client terminal 60 receiving the video are easily performed. Smooth camera control is thus assured, for example, by transferring the control of the camera 10 among client terminals 60.

In the fifth embodiment, the user face image data may be stored in an unshown information server connected to the network rather than in each client terminal. The video receiving software 412 in the client terminal 60 communicates with the information server to retrieve a desired user's face image. Standard protocols for resource retrieval such as HTTP or LDAP may be used. A Web server or ILS server may be used as an information server.

Since the terminals receiving the video from the same camera can communicate with each other in accordance with the fifth embodiment, smooth camera control is achieved.

The storage medium holding a program code of software for carrying out the functions of the embodiments is loaded in the system or apparatus. The computer (CPU or MPU) of the system or apparatus reads the program code stored in the storage medium to execute the program.

The program code read from the storage medium performs the above-described functions of the embodiments, and the storage medium storing the program code constitutes the present invention.

Available as storage media for feeding the program code are floppy disk, hard disk, optical disk, magneto-optic disk, CD-ROM, CD-R, magnetic tape, non-volatile memory card, ROM and the like.

By executing the program code read by the computer, the functions of the embodiments are performed. Furthermore, the OS (Operating System) running on the computer performs partly or entirely an actual process according to the instruction of the program code, and the functions of the embodiments are thus performed.

The program code read from the storage medium is written on a function expansion board inserted into the computer or a memory provided on a function expansion unit. CPU on the expansion board or unit partly or entirely performs the process. The functions of the embodiments are thus performed.

When the above embodiments are implemented in the storage medium, the storage medium stores the program code corresponding to the above-referenced flow diagrams. In other words, modules indispensable to the camera control system of each of the above embodiments is stored in the storage medium.

What is claimed is:

1. A video sending terminal for sending to client terminals a video from a video camera through a network and controlling the video camera in accordance with a control command from a client terminal which has control of the video camera, the video sending terminal comprising:

an issuing device that issues control of the video camera in response to a request, for control of the video camera, made by a client terminal;

a control device that controls the video camera in response to the control command from the client terminal to which the issuing device has issued control of the video camera; and a notifying device that notifies the client terminal, which currently has control of the video camera issued by the issuing device, of an other client terminal making a new request for control of the video camera, when the new request for control of the video camera is made by said other client terminal.

2. A video sending terminal according to claim 1, wherein the notifying device notifies the client terminal, which currently has control of the video camera, of information about said other client terminal which has made the new request for control of the video camera.

3. A video sending terminal according to claim 1, wherein the notifying device notifies the client terminal, which has made the new request for control of the video camera, of information about the client terminal which currently has control of the video camera.

4. A video sending terminal according to claim 1, wherein the notifying device notifies a client terminal, which receives the video from the video camera, of information about an other client terminal which has newly gained control of the video camera when said other client terminal newly gains control of the video camera.

5. A video sending terminal according to claim 1, wherein the notifying device notifies a client terminal, which receives the video from the video camera, that control of the video camera has been released, when the client terminal which had control of the video camera releases control of the video camera.

6. A video sending terminal according to claim 1, further comprising a registering device that registers an order of priority of the client terminals, wherein the issuing device issues control of the video camera in accordance with the order of priority registered by the registering device.

7. A client terminal for controlling a video camera by gaining control of the video camera, the client terminal comprising:

an output device that outputs, to a video sending terminal, a new request for control of the video camera; and a notifying device that notifies an other client terminal, which currently has control of the video camera, that the output device has issued the new request for control of the video camera to the video sending terminal.

8. A client terminal according to claim 7, wherein the notifying device notifies a client terminal, which receives video from the video camera, that control of the video camera has been released, when the client terminal which had control of the video camera releases control of the video camera.

9. A client terminal according to claim 7, wherein the notifying device notifies the client terminal, which is currently receiving video from the video camera, that the client terminal has gained control of the video camera when the client terminal gains control of the video camera by outputting a request for control of the video camera from the output device.

10. A client terminal according to claim 7, further comprising a display device that displays information notified by the notifying device as text information.

11. A video sending terminal for sending to client terminals a video from a video camera through a network and controlling the video camera in accordance with a control command from a client terminal, the video sending terminal comprising:

a control device that controls the video camera in accordance with the control command of the video camera; and a notifying device that notifies a first client terminal that a new control command for the video camera has been received from a second client terminal, when the new control command is received from the second client terminal different from the first client terminal which has issued the control command under which the control device currently controls the video camera.

12. A video sending terminal according to claim 11, wherein the notifying device notifies the first client terminal, which currently controls the video camera, of information about the second client terminal which has newly issued the new control command for the video camera.

13. A video sending terminal according to claim 11, wherein the notifying device notifies the second client terminal, which has issued the new control command, of information about the first client terminal which currently controls the video camera, when the new control command is issued with the video camera under the current control.

14. A video sending terminal according to claim 11, wherein the notifying device notifies a client terminal, which currently receives the video from the video camera, of information about the second client terminal which has issued the new control command for the video camera, when the new control command for the video camera is issued.

15. A client terminal for controlling a video camera by issuing a control command to a video sending terminal, the client terminal comprising:

an output device that outputs the control command for the video camera to the video sending terminal; and a notifying device that notifies an other client terminal, which currently controls the video camera, that a new control command for the video camera has been issued to the video sending terminal.

16. A client terminal according to claim 15, wherein the notifying device notifies a client terminal, which receives video from the video camera, that control of the video camera is terminated when the control of the video camera is terminated.

17. A client terminal according to claim 15, wherein the notifying device notifies an other client terminal, which receives video from the video camera, that the video camera is now controlled by the client terminal when the video camera gives an output in response to a control signal output by the client terminal.

18. A client terminal according to claim 15, further comprising a display device that displays information notified by the notifying device as text information.

19. A client terminal for controlling a plurality of video cameras through a network, the client terminal comprising:

a display device that selectively displays videos from the plurality of video cameras on the same screen; and a retrieving device that retrieves information about a user of an other client terminal, if said other client terminal receives any video, among the videos from the plurality of video cameras, presented in the display device, wherein, for displaying, the display device superimposes information about a user of the client terminal retrieved by the retrieving device onto the video which said other client terminal also receives from the video camera.

20. A client terminal according to claim 19, wherein the retrieving device retrieves the information about the user of the other client terminal, if said other client terminal controls one of the plurality of video cameras that provide the video on the display device.

21. A client terminal according to claim 20, wherein, with the video camera under control, the display device displays the videos, with the user of the client terminal controlling the video camera and the user of the other client terminal just receiving the video from the video camera discriminated one from another.

22. A client terminal according to claim 19, further comprising a communication device that communicates with a client terminal corresponding desired information by indicating the desired information among a plurality of pieces of information about users of the client terminals presented by the display device.

23. A client terminal according to claim 19, wherein information about the user of the client terminal retrieved by the retrieving device is video information to identify the user.

24. A control method for a camera control system, in which a plurality of client terminals selectively control a video camera connected to a video sending terminal, the control method comprising the steps of:

controlling the video camera according to a request for control of the video camera received from a client terminal of the plurality of client terminals, the client terminal having current control of the video camera;

outputting from an other client terminal of the plurality of client terminals a new request for control of the video camera;

issuing control of the video camera in response to receipt of the new request for control of the video camera from the other client terminal; and notifying the client terminal which has current control of the video camera that the new request for control of the video camera has been received, when the new request for control of the video camera is received from the other client terminal.

25. A control method according to claim 24, wherein the notifying step includes notifying the client terminal which has current control of the video camera of information about the other client terminal which output the new request for control of the video camera.

26. A control method according to claim 24, wherein the notifying step includes notifying the other client terminal, which output the new request for control of the video camera, of information about the client terminal which has current control of the video camera, when the new request for control of the video camera is received.

27. A control method for a camera control system, in which a video camera is controlled by sending a control command to a video sending terminal, the control method comprising the steps of:

controlling the video camera in accordance with a control command for the video camera sent to the video sending terminal by a first client terminal, the first client having current control of the video camera; and notifying the first client terminal that a new control command for the video camera has been sent from a second client terminal to the video sending terminal, when the new control command is received by the video sending terminal from the second client terminal.

28. A control method according to claim 27, wherein the notifying step includes notifying the first client terminal, which has current control of the video camera, of information about the second client terminal which has sent the new control command for the video camera.

29. A control method according to claim 27, wherein the notifying step includes notifying the second client terminal, which has issued the new control command, of information about the first client terminal which has current control of the video camera, when the new control command is issued with the video camera under current control.

30. A camera control method, in which a client terminal controls a plurality of video cameras by issuing a control command through a network, the camera control method comprising the steps of:

selectively displaying videos from the plurality of video cameras on the same screen; and retrieving information about a user of an other client terminal, if the other client terminal receives any video, among the videos from the plurality of video cameras, presented in the displaying step, wherein, for displaying, the displaying step superimposes the information about the user of the other client terminal retrieved in the retrieving step onto the video which the other client terminal also receive from the video camera.

31. A camera control method according to claim 30, wherein the retrieving step retrieves the information about the user of the other client terminal, if the other client terminal controls one of the plurality of video cameras that provide the videos presented in the displaying step.

32. A camera control method according to claim 30, wherein, with video camera under control, the displaying step displays the videos with the user of the client terminal controlling the video camera and the user of the other client terminal just receiving the video from the video camera discriminated one from the other.

33. A camera control method according to claim 30, further comprising a communication step for communicating with a client terminal corresponding desired information by indicating the desired information among a plurality of pieces of information about the users of the client terminals presented in the displaying step.

34. A camera control method according to claim 30, wherein the information about the user of the client terminal retrieved in the retrieving step is video information to identify the user.

35. A storage medium storing a program that is executed by a video sending terminal that controls a video camera in accordance with a control command from a client terminal having control of the video camera, the program comprising the steps of:

issuing control of the video camera in response to a request for control of the video camera output by the client terminal; and notifying the client terminal, which currently has control of the video camera, that the request for control of the video camera has been newly issued, when the request for control of the video camera has been newly issued with the video camera under control.

36. A storage medium storing a program that is executed by a client terminal that controls a video camera by gaining control, the program comprising the steps of:

outputting a request for control of a video camera to a video sending terminal; and notifying an other client terminal, which currently has control of the video camera, that the request for control of the video camera has been issued to the video sending terminal, when the other client terminal has current control of the video camera.

37. A storage medium storing a program that is executed by a video sending terminal that sends a video from a video camera to a client terminal through a network and controls the video camera in accordance with a control command from the client terminal, the program comprising the steps of:

controlling the video camera in accordance with the control command for the video camera; and notifying a first client terminal that a control command for the video camera has been newly received from a second client terminal, when the control command has been newly received from the second client terminal different from the first client terminal which has issued the control command under which the video camera is currently controlled.

38. A storage medium storing a program that is executed by a client terminal that controls a video camera by outputting a control command to a video sending terminal, the program comprising the steps of:

outputting the control command for the video camera to the video sending terminal; and notifying an other client terminal, which currently controls the video camera, that a control command for the video camera has been output to the video sending terminal, when the video camera is controlled by the other client terminal.

39. A storage medium storing a program that is executed by a client terminal that controls a plurality of video cameras through a network, the program comprising the steps of:

selectively displaying videos from the plurality of video cameras on the same screen; and retrieving information about a user of an other client terminal, if the other client terminal receives any video, among the videos from the plurality of video cameras, presented in the displaying step, wherein, when displayed, the information about the user of the other client terminal retrieved is superimposed onto the video which the other client terminal also receives from the video camera.

40. A storage medium according to claim 39, wherein the information about the user of the other client terminal is retrieved, if the other client terminal controls one of the plurality of video cameras that provide the videos.

41. A storage medium according to claim 39, wherein, with the video camera under control, the videos are displayed with the user controlling the video camera and the user just receiving the video from the video camera discriminated one from the other.

42. A storage medium according to claim 39, wherein communicating with a client terminal corresponding desired information is performed by indicating the desired information among a plurality of pieces of information about the users of the client terminals.

* * * * *

UNITED STATES PATENT AND TRADEMARK OFFICE
CERTIFICATE OF CORRECTION

PATENT NO. : 6,741,276 B1
DATED : May 25, 2004
INVENTOR(S) : Hiroki Yonezawa et al.

It is certified that error appears in the above-identified patent and that said Letters Patent is hereby corrected as shown below:

Column 1,
Line 39, "whey" should read -- why --.

Colum 6,
Line 52, "include" should read -- includes --.

Column 7,
Line 46, "to D&D" should read -- to as D&D --.

Signed and Sealed this

Seventh Day of September, 2004

JON W. DUDAS
*Director of the United States Patent and Trademark Office*